US012709493B2

(12) United States Patent
Zmeu et al.

(10) Patent No.: US 12,709,493 B2
(45) Date of Patent: Aug. 18, 2026

(54) PICK-AND-PLACE SYSTEM AND METHOD

(71) Applicant: The Boeing Company, Arlington, VA (US)

(72) Inventors: Sandra L. Zmeu, Shoreline, WA (US); Jonathan Y. Ahn, Seattle, WA (US); Austin B. Ball, Seattle, WA (US); Ricardo A. Fritzke, Sammamish, WA (US); Christopher R. Brown, Seattle, WA (US)

(73) Assignee: The Boeing Company, Chicago, IL (US)

( * ) Notice: Subject to any disclaimer, the term of this patent is extended or adjusted under 35 U.S.C. 154(b) by 833 days.

(21) Appl. No.: 18/163,812

(22) Filed: Feb. 2, 2023

(65) Prior Publication Data

US 2024/0262638 A1 Aug. 8, 2024

(51) Int. Cl.
*B65G 47/90* (2006.01)

(52) U.S. Cl.
CPC .... *B65G 47/907* (2013.01); *B65G 2201/0294* (2013.01)

(58) Field of Classification Search
CPC ................ B65G 47/907; B65G 47/847; B65G 2201/0294; B25J 13/082; B25J 13/08; B64F 5/10
USPC ................................................ 294/103.1, 902
See application file for complete search history.

(56) References Cited

U.S. PATENT DOCUMENTS 332,347 A * 12/1885 Keelyn .................. F16G 11/04
24/136 R
4,872,803 A * 10/1989 Asakawa .............. B25J 9/1015
414/730
10,275,565 B2 * 4/2019 Vasquez .................... B64F 5/10
11,597,092 B1 * 3/2023 Alspaugh .................. B25J 9/06
11,780,091 B2 * 10/2023 Kono ..................... B25J 9/1697
700/259
12,298,733 B2 * 5/2025 Ros Vega ............ G05B 19/404
2020/0122342 A1 4/2020 Mukou

FOREIGN PATENT DOCUMENTS

DE 102012019958 4/2013
DE 102019135471 6/2021
DE 102020120294 2/2022

OTHER PUBLICATIONS

PI Company, "Vacuum Compatible 6-Axis Hexapod" brochure, available at <WWW.PI.WS>, retrieved on Feb. 1, 2023.
Hexagon Metrology, "Leica Absolute Tracker AT960" brochure, available at <www.hexagon.com>, retrieved on Jan. 8, 2023.
EPO, Extended European Search Report for Appl. No. 24155263.7, issued on Jul. 5, 2024.

* cited by examiner

*Primary Examiner* — Ronald P Jarrett

(57) ABSTRACT

A pick-and-place system includes a rigid elongate strongback, configured to be supported by a robotic arm of a robotic device. In addition, the pick-and-place system includes a plurality of actuator-clamp assemblies, mountable in spaced relation to each other on the strongback. Each actuator-clamp assembly includes one or more jaw assemblies, each configured to clamp onto a localized segment of a workpiece. Each actuator-clamp assembly also includes a multi-axis actuator, configured to couple the one or more jaw assemblies to the strongback and adjust an orientation of the localized segment prior to placement of the workpiece onto a mating structure.

20 Claims, 22 Drawing Sheets

PICK-AND-PLACE SYSTEM AND METHOD

FIELD

The present disclosure relates generally to manufacturing systems and, more particularly, to a pick-and-place system configured to pick up and place long flexible components.

BACKGROUND

On a production line of a manufacturing facility, individual components are moved from one or more component processing stations to an assembly station where the components are assembled with other components to form an assembly. For example, in a production line for a composite wing of an aircraft, pre-cured composite stringers are moved from a stringer processing station such as a stringer trim tool, to a wing assembly station where the composite stringers are placed on a composite wing panel. Other components such as wing ribs and wing spars are also assembled to the wing panel to form a wing assembly.

Conventional method for picking up and placing composite stringers on a wing panel include the use of gantry systems. Composite stringers for a wing are typically long, and are flexible in their pre-cured state. As a result, a gantry system must have multiple heads for supporting the composite stringer at multiple locations along the stringer length, which adds complexity and cost to the stringer placement system. In addition, the gantry system must extend across the width of the wing panel to allow for placement of a full shipset of composite stringers. As a result, gantry systems for stringer placement can occupy a large amount of factory floorspace.

Adding to the challenges associated with gantry systems is the requirement for stringer manipulation prior to placement on the wing panel, wherein each initially straight stringer must be twisted such that the stringer mating surface matches the contours of the wing panel. Furthermore, the gantry system must provide high positional accuracy in placing each composite stringer on the wing panel. Current positioning methods use a compensated offset of the stringer flanges to define a theoretical centerline of the stringer, rather than its actual centerline, for aligning with an intended centerline on the wing panel. Although large placement tolerances can be compensated for by the structural design of the wing assembly, such compensating structural design typically results in increased structural mass (i.e., increased weight) of the wing assembly.

As can be seen, there exists a need in the art for a system and method for picking up, manipulating, and placing long flexible components in a manner that avoids the above-noted challenges.

SUMMARY

The above-noted needs associated with picking up and placing long flexible components are specifically addressed and alleviated by the present disclosure, which provides a pick-and-place system having a rigid elongate strongback, configured to be supported by a robotic arm of a robotic device. In addition, the pick-and-place system includes a plurality of actuator-clamp assemblies, mountable in spaced relation to each other on the strongback. Each actuator-clamp assembly includes one or more jaw assemblies, each configured to clamp onto a localized segment of a workpiece. Each actuator-clamp assembly also includes a multi-axis actuator, configured to couple the one or more jaw assemblies to the strongback and adjust the orientation of the localized segment prior to placement of the workpiece onto a mating structure.

Also disclosed is a pick-and-place system having a robotic device. The robotic device has a robotic arm. The pick-and-place system includes a rigid elongate strongback, supported by the robotic arm. In addition, the pick-and-place system includes a plurality of actuator-clamp assemblies, mountable in spaced relation to each other on the strongback. Each actuator-clamp assembly includes one or more jaw assemblies, each configured to clamp onto a localized segment of a workpiece. Each actuator-clamp assembly also includes a multi-axis actuator, configured to couple the one or more jaw assemblies to the strongback and adjust the orientation of the localized segment prior to placement of the workpiece onto a mating structure. The pick-and-place system also includes a controller, configured to control the robotic arm and the multi-axis actuator of each actuator-clamp assembly in a manner to position the workpiece on the mating structure such that an actual centerline of the localized segments of the workpiece is aligned with an intended centerline of the workpiece on the mating structure.

Also disclosed is method of picking up a workpiece and placing the workpiece on a mating structure. The method includes clamping onto localized segments of the workpiece, respectively using a plurality of jaw assemblies respectively of a plurality of actuator-clamp assemblies mountable in spaced relation to each other on a rigid elongate strongback. The method also includes picking up the workpiece using a robotic arm coupled to the strongback, and adjusting the orientation of the localized segments when the workpiece is supported in three-dimensional space by the strongback, using a plurality of multi-axis actuators respectively coupling the plurality of jaw assemblies to the strongback. The method additionally includes placing the workpiece on a mating structure by operating the robotic arm in coordination with the multi-axis actuators.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein.

DETAILED DESCRIPTION

Disclosed examples or versions will now be described more fully hereinafter with reference to the accompanying drawings, in which some, but not all of the disclosed examples or versions are shown. Indeed, several different examples or versions may be provided, and should not be construed as limited to the examples or versions set forth herein. Rather, these examples or versions are provided so that this disclosure will be thorough and fully convey the scope of the disclosure to those skilled in the art.

This specification includes references to "some examples," "one example," or "an example." Instances of the phrases "some examples," "one example" or "an example" do not necessarily refer to the same example. Particular features, structures, or characteristics may be combined in any suitable manner consistent with this disclosure.

As used herein, "comprising" is an open-ended term, and as used in the claims, this term does not foreclose additional structures or steps.

As used herein, "configured to" means various parts or components may be described or claimed as "configured to" perform a task or tasks. In such contexts, "configured to" is used to connote structure by indicating that the parts or components include structure that performs those task or tasks during operation. As such, the parts or components can be said to be configured to perform the task even when the specified part or component is not currently operational (e.g., is not on).

As used herein, an element or step recited in the singular and preceded by the word "a" or "an" should be understood as not necessarily excluding the plural of the elements or steps.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

Figure 1:
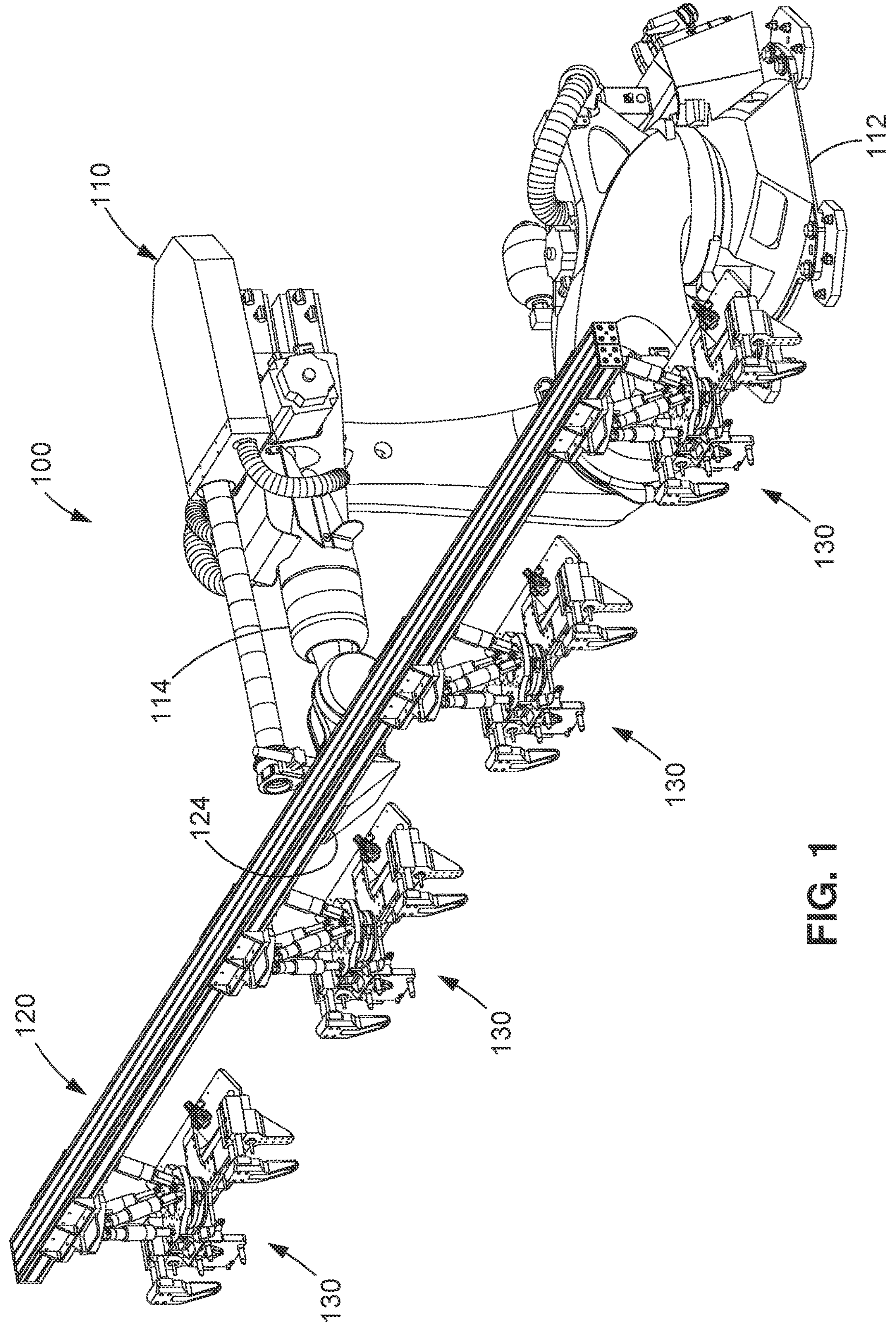
FIG. 1 is a perspective view of a pick-and-place system having a strongback that is supportable by a robotic arm of a robotic device, and having a plurality of actuator-clamp assemblies for clamping onto a workpiece.
Figure 2:
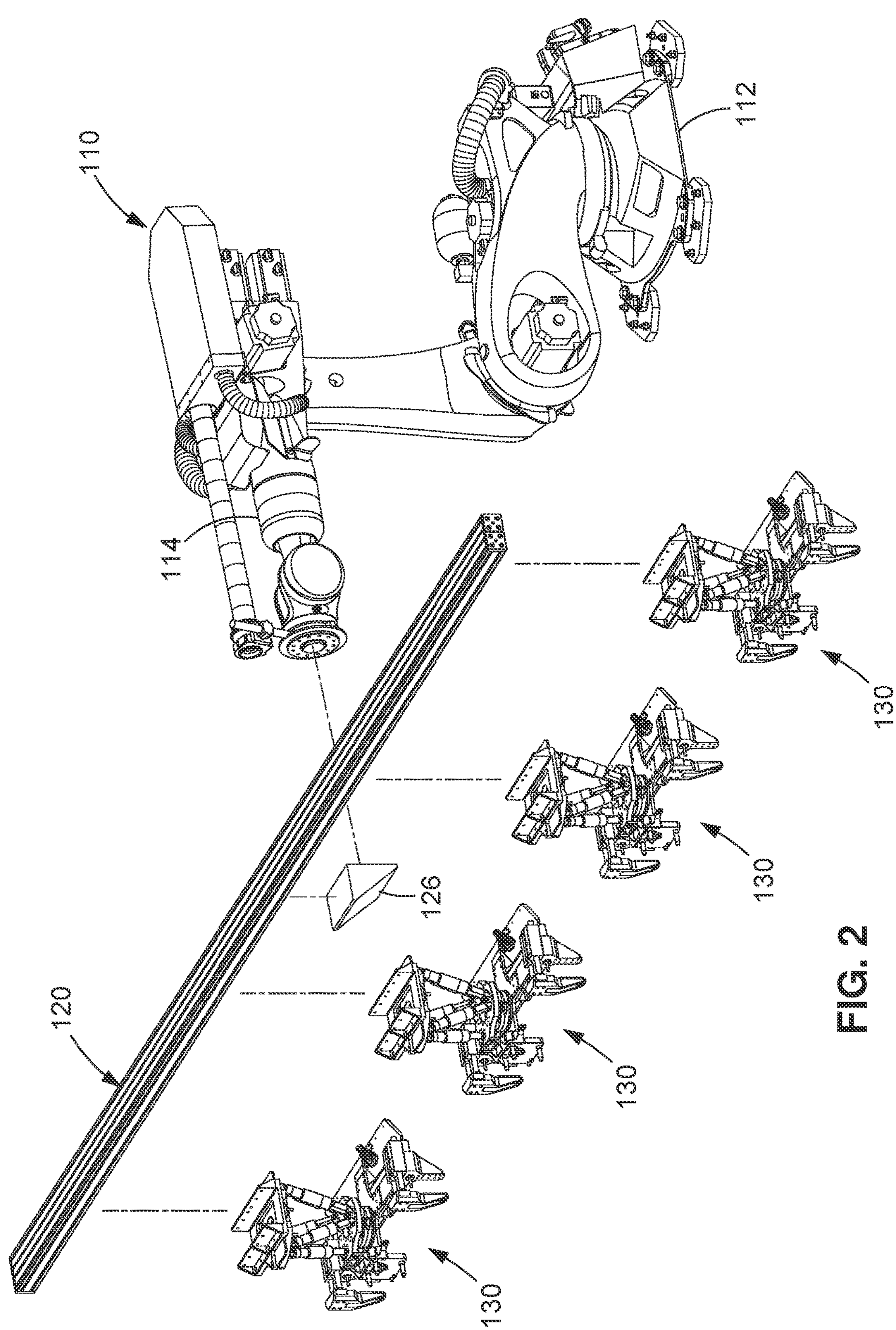
FIG. 2 is a partially exploded view of the pick-and-place system of FIG. 1, illustrating the strongback separated from the robotic arm, and the actuator-clamp assemblies separated from the strongback.
Figure 18:
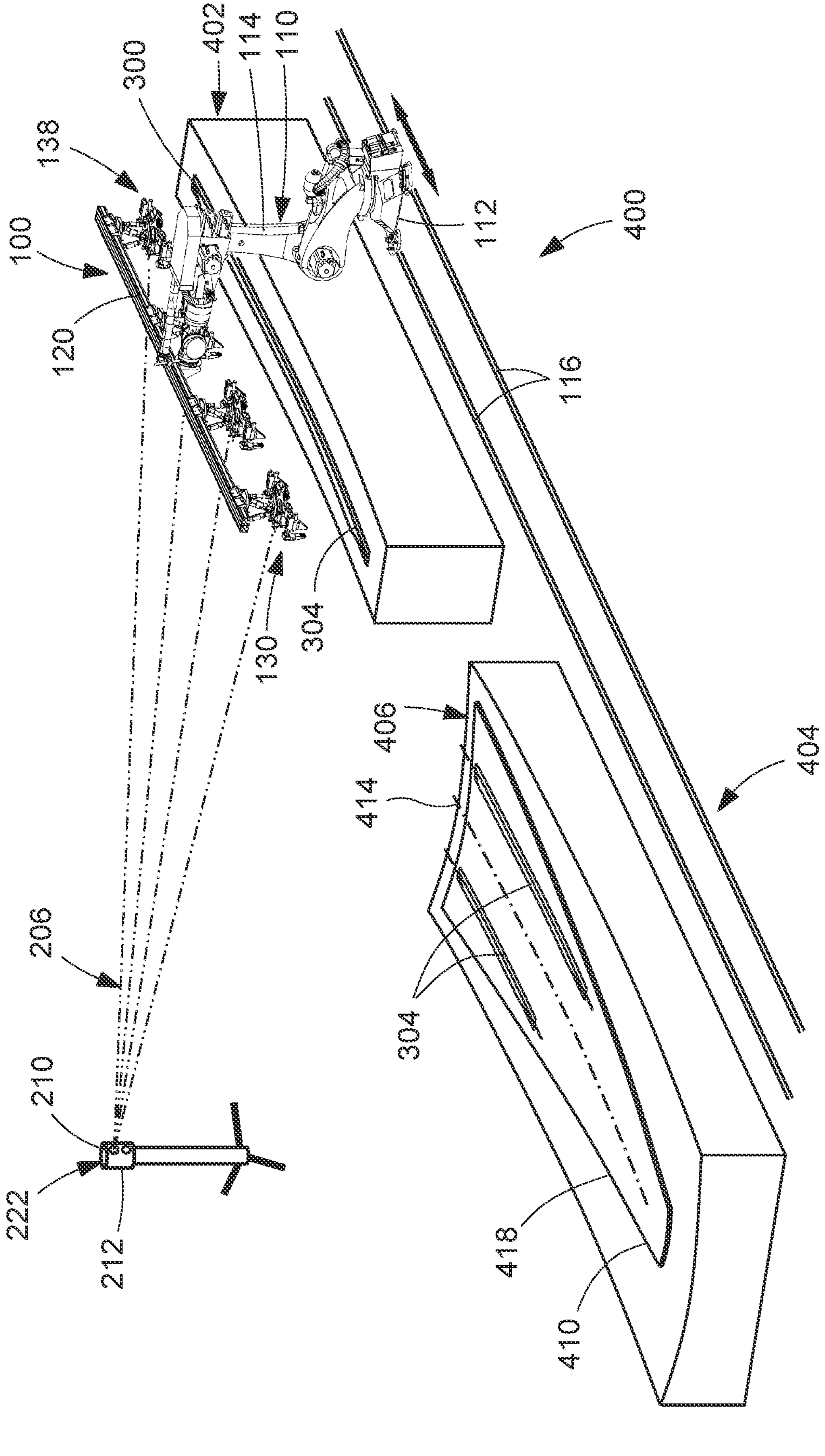
FIG. 18 is a perspective view of the pick-and-place system in preparation for picking up the stringer on the stringer trim tool and moving the stringer over to a wing assembly tool.

Referring to FIGS. 1-2, shown is an example of a pick-and-place system 100 configured to pick up an elongate workpiece 300 (FIG. 8), manipulate the workpiece 300, and accurately place the workpiece 300 on a mating structure 410 (FIG. 18). In the present disclosure, the pick-and-place system 100 is described in the context of picking up, manipulating, and placing a pre-cured composite stringer 304 (i.e., the workpiece 300) onto a composite wing panel 418 (i.e., the mating structure 410). However, the pick-and-place system 100 may be implemented for picking up and placing a workpiece 300 of any size, shape, and material composition (metallic or non-metallic), and cure state (for composite materials).

Figure 28:
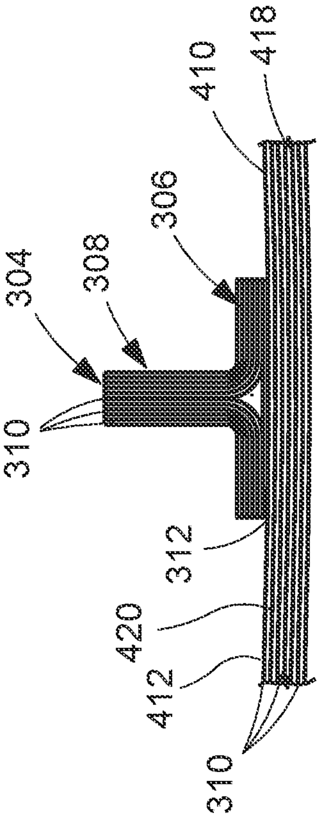
FIG. 28 is a magnified view of the portion of the wing assembly identified by reference numeral 28 of FIG. 27, and illustrating composite plies that make up the stringer and a wing panel.
Figure 27:
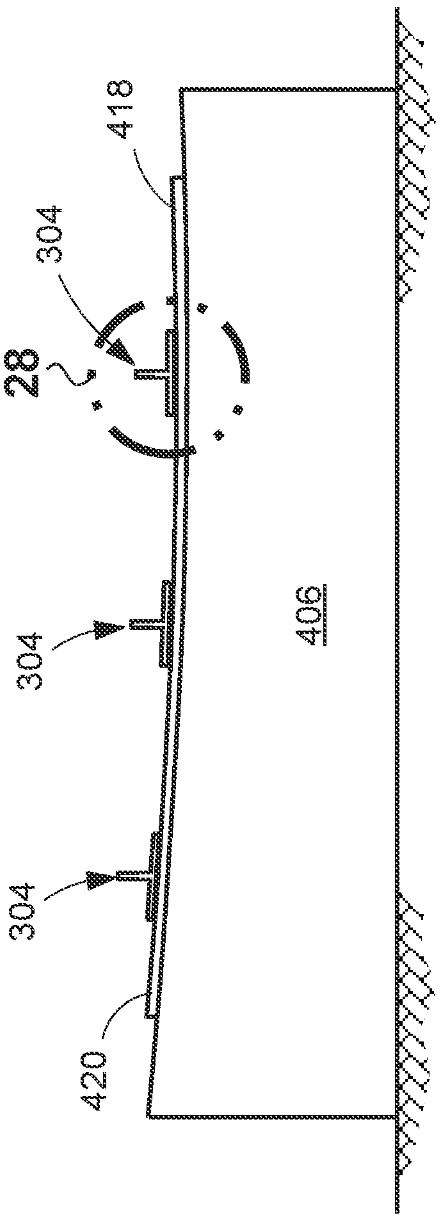
FIG. 27 is an end view of the wing assembly tool showing the stringers placed on the wing panel.
Figure 29:
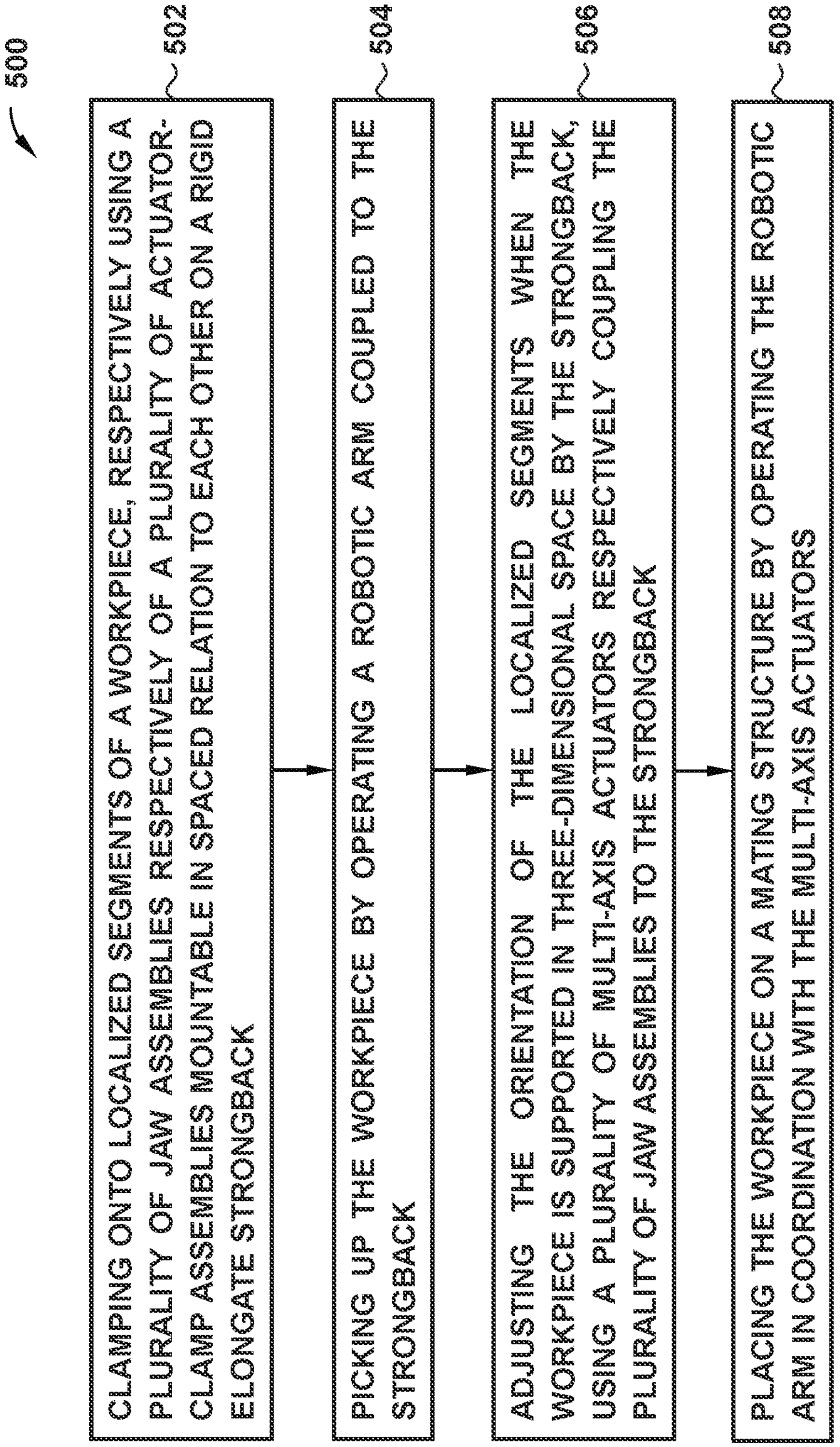
FIG. 29 is a flowchart of operations included in a method of picking up a workpiece and placing the workpiece on a mating structure.

Referring briefly to FIGS. 28-29, shown in FIG. 28 is a side view of the wing assembly tool 406 showing pre-cured stringers 304 on a wing panel 418. Each stringer 304 has a T-shaped cross section comprising a web 308 and a flange 306. As shown in FIG. 29, each stringer 304 is made up of a stack of pre-cured composite plies 310. Each composite ply 310 is comprised of reinforcing fibers (e.g., carbon fibers) impregnated with a polymer matrix material (e.g., epoxy resin). Due to their pre-cured state, the stringers 304 are relatively flexible, and therefore must be supported at spaced intervals along their length. Toward this end, the pick-and-place system 100 (FIG. 1) includes a rigid elongate strongback 120 (FIG. 1) for supporting a workpiece 300 at spaced intervals along its length.

Figure 22:
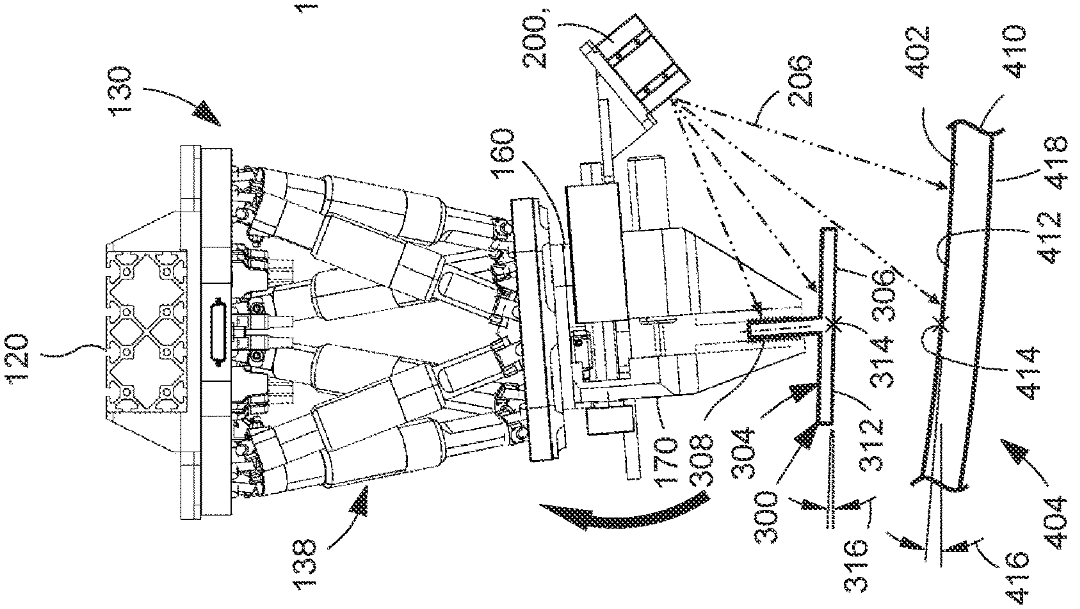
FIG. 22 is a side view of one of the actuator clamp assembly of FIG. 21, and illustrating a laser beam (e.g., a laser band) emitted by the laser profilometer for measuring the loft angle of the mating surface of the localized segment of the stringer relative to the loft angle of the wing panel.

In FIG. 28, the underside of the flange 306 serves as the workpiece mating surface 312 of the stringer 304, and is placed in contact with the mating surface 412 of the mating structure 410 which, in the present disclosure, is the inner mold line 420 (FIG. 22) of the wing panel 418 (FIG. 22). In the present disclosure, the loft angle 416 (FIG. 22) of the inner mold line 420 is variable along the length of the wing panel 418. Advantageously, the pick-and-place system 100 is configured to manipulate or twist the stringer 304 until the workpiece loft angle 316 (FIG. 22) of the stringer 304 matches the loft angle 416 of the inner mold line 420, prior to placement of the stringer 304 on the wing panel 418, as described in greater detail below.

Referring to FIGS. 1, 2, 8 and 10, the strongback 120 is supported by a robotic arm 114 of a robotic device 110. In the example shown, the robotic device 110 is identified as a KR270 robot, commercially available from KUKA AG, of Augsburg, Germany, and having a 6-axis robot arm with a 270 kg payload capacity and a 2900 mm reach capability. However, any one of a variety of alternative robotic devices can be used in the pick-and-place system 100, including a robotic device having lesser or greater freedom of movement capabilities (e.g., 7 degrees-of-freedom), lower or higher payload capacities, and/or shorter or longer reach capabilities than the above-described robotic device 110 shown in the figures. The robotic arm 114 is coupled to the strongback 120 at a strongback-robot joint 124 via a strongback-robot coupling bracket 126. In the example shown, the strongback-robot joint 124 is located at an approximate strongback midpoint. The pick-and-place system 100 includes a controller 102 (FIGS. 16-17) for controlling the robotic device 110 and other components of the pick-and-place system 100, as described below.

Figure 19:
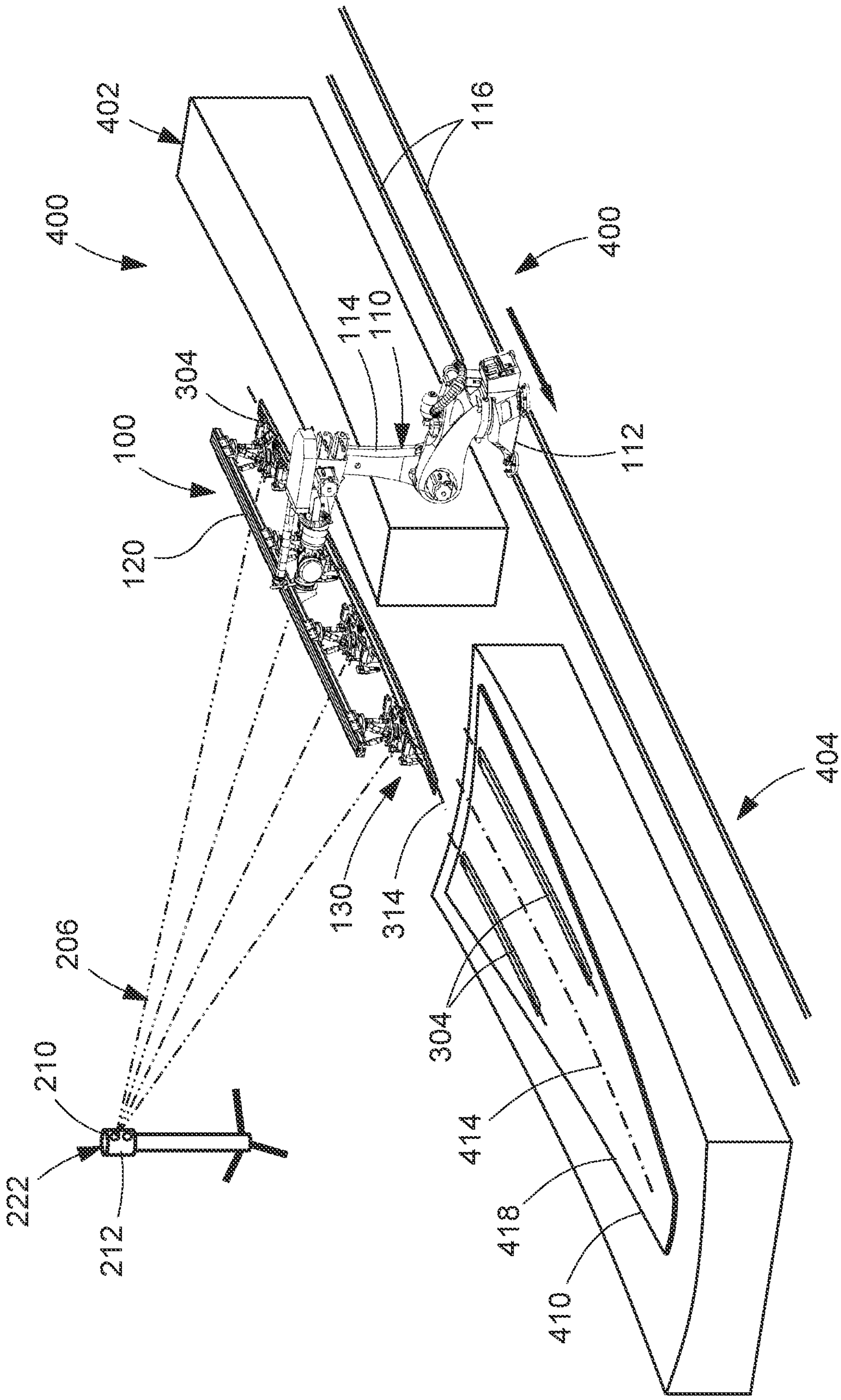
FIG. 19 shows the robotic device of the pick-and-place system moving along rails toward the wing assembly tool.
Figure 20:
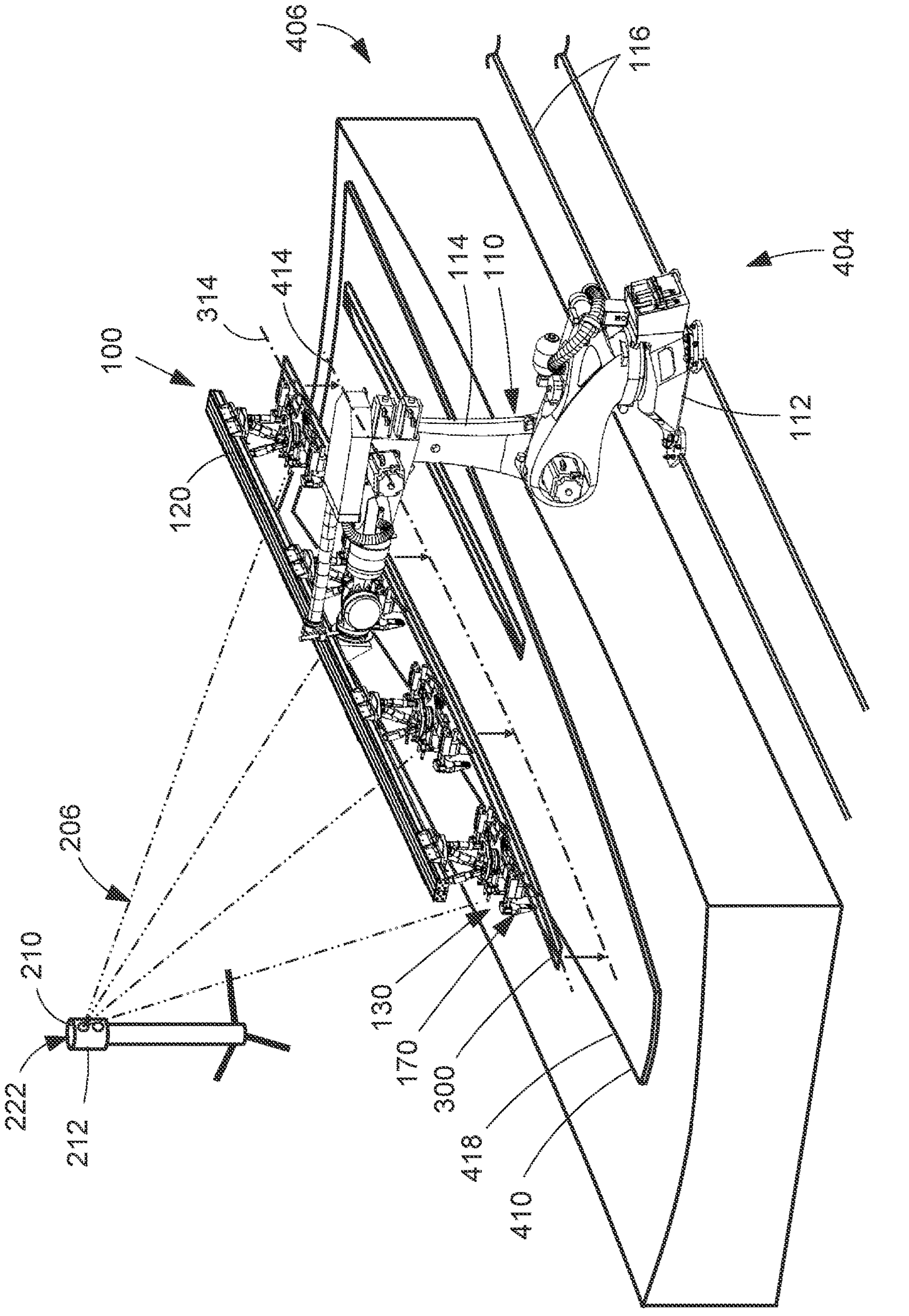
FIG. 20 shows pick-and-place system positioning the stringer over the wing assembly tool.

The robotic device 110 includes a robotic device base 112. In the example shown, the robotic device base 112 is supported on a pair of rails 116 that are embedded in the shop floor, to allow the robotic device 110 to move between a workpiece pickup station 400 (FIG. 18) and a workpiece placement station 404 (FIG. 18). For example, FIGS. 18-20 show the pick-and-place system 100 picking up a stringer 304 at a stringer trim tool 402 (e.g., the workpiece pickup station 400), and placing the stringer 304 on the wing panel 418 at a wing assembly tool 406 (e.g., the workpiece placement station 404), as described in greater detail below. However, in other examples not shown, the rails 116 can be supported on a raised platform (not shown). In still other examples not shown, the robotic device base 112 can be stationary, and non-movably secured to the shop floor. In the case of a stationary robotic device, the robotic arm 114 can have sufficient reach to enable moving workpieces 300 from a workpiece pickup station 400 to a workpiece placement station 404.

In FIGS. 1-2, the strongback 120 is a rigid element having a length that is approximately the same length as the workpiece 300 (FIG. 8) to be moved. In one example, the strongback 120 can have a length of up to 60 feet or more. The length of the strongback 120 is dependent, at least in part, on the length and/or weight of the workpiece 300, and/or on the payload capacity of the robotic arm 114.

Although the figures illustrate the handling of a workpiece 300 using a pick-and-place system 100 having a single robotic device 110 and a single strongback 120, in other examples not shown, a pick-and-place system can include 2 or more robotic devices 110 supporting a single common strongback 120, as may be required for moving a workpiece 300 having a long length and/or a large structural mass (i.e., weight). For example, a single pick-and-place system can include 3 robotic devices 110 (not shown) supporting a single common strongback 120 at 3 different locations along the length of the strongback 120, as may be required for handling a full wing-span-length stringer of a large aircraft. In still other examples not shown, 2 or more pick-and-place systems can be operated in a coordinated manner to move a single workpiece 300 having a long length. For example, 3 separate pick-and-place systems, each having a robotic device 110 supporting a dedicated strongback 120, can be operated in a coordinated manner for supporting a full wing-span-length stringer at 3 different locations along its length.

Figure 3:
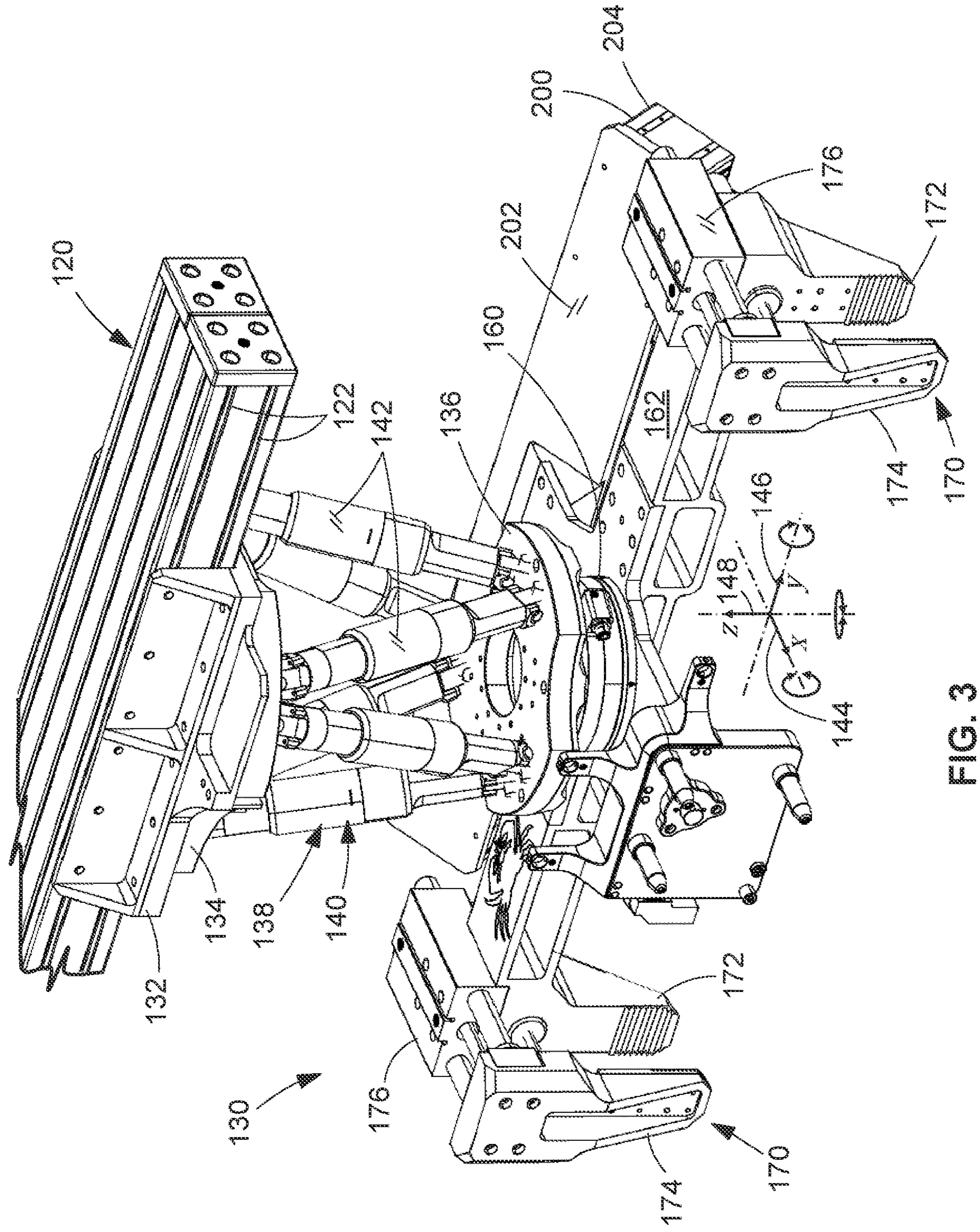
FIG. 3 shows an example of an actuator-clamp assembly comprising a pair of jaw assemblies, and a multi-axis actuator coupling a pair of jaw assemblies to the strongback.

Referring to FIGS. 1-5, the pick-and-place system 100 includes a plurality of actuator-clamp assemblies 130, which are controlled by the controller 102. The actuator-clamp assemblies 130 are mountable in spaced relation to each other on the strongback 120. Although the presently disclosed example of the pick-and-place system 100 has a total of 4 actuator-clamp assemblies 130 uniformly spaced along the strongback 120, a pick-and-place system 100 can have any number of actuator-clamp assemblies 130 positionable on the strongback 120 at any spacing from each other. An equal number of actuator-clamp assemblies 130 can be mounted on opposite sides of the strongback-robot joint 124. As shown in FIG. 3, the strongback 120 can have lengthwise grooves 122 to allow for adjusting the location of each actuator-clamp assembly 130 along the strongback 120. However, in other examples not shown, the strongback 120 can be devoid of lengthwise grooves 122, and/or each multi-axis actuator 138 can be non-movably coupled to the strongback 120.

Figure 4:
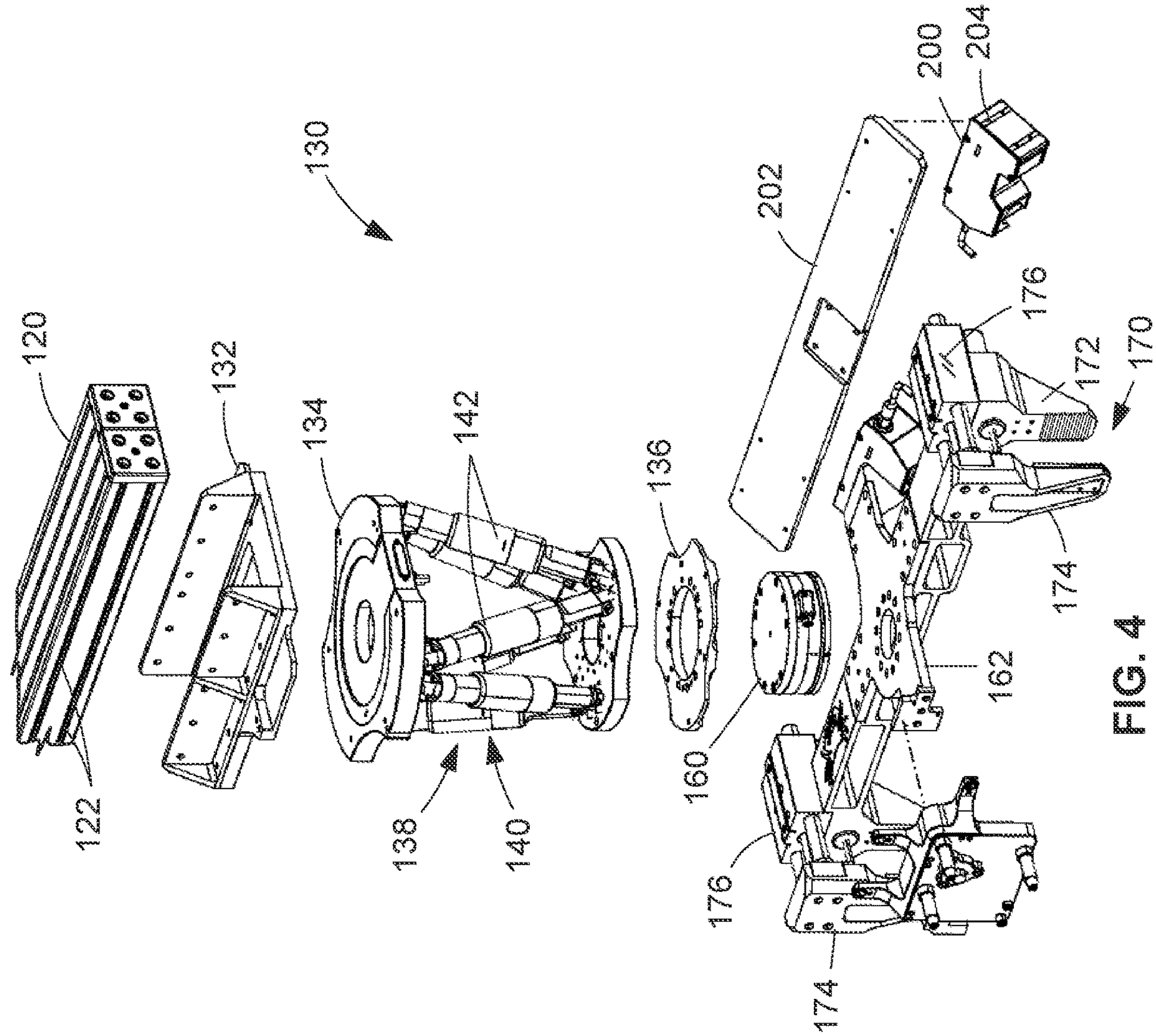
FIG. 4 is a front exploded view of the actuator-clamp assembly of FIG. 3.
Figure 5:
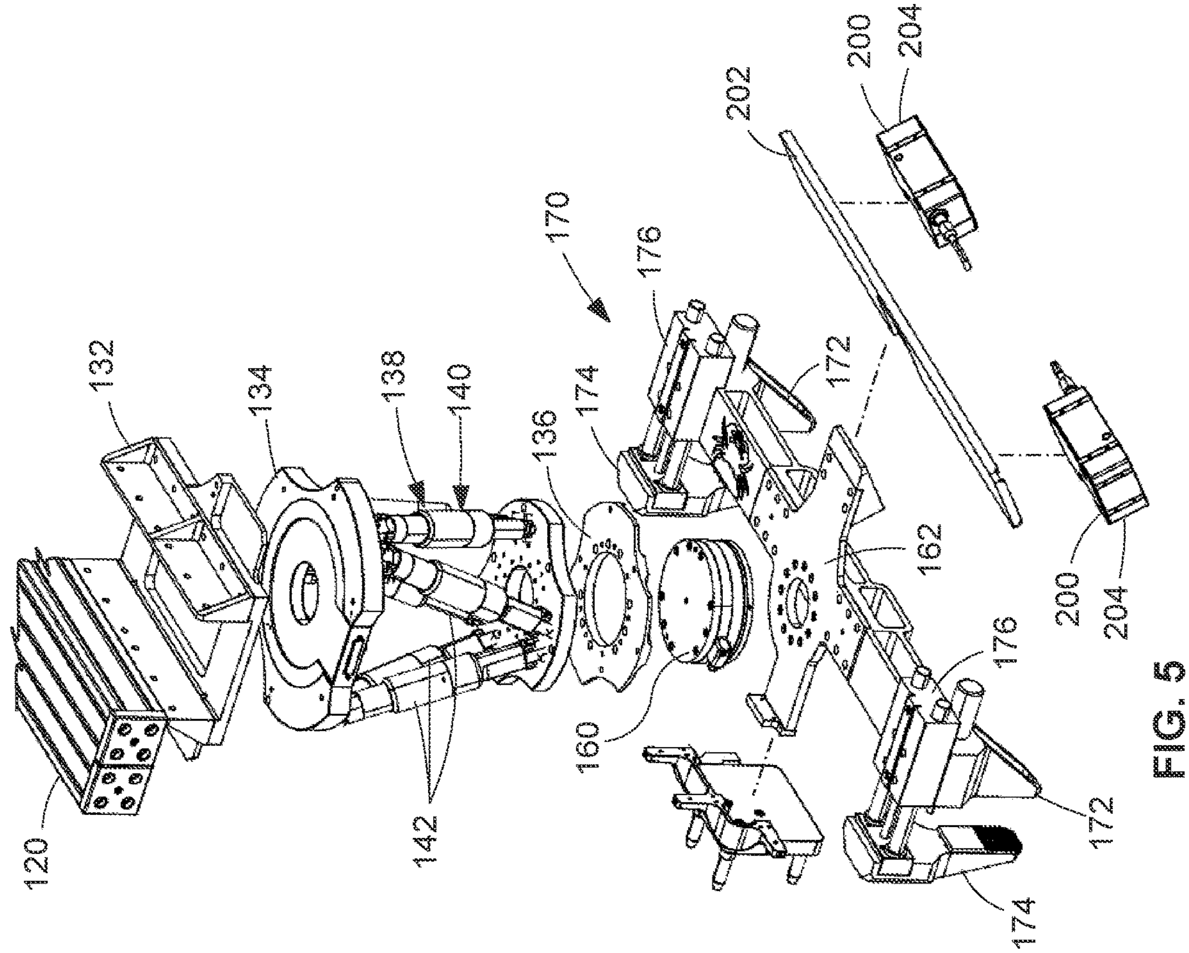
FIG. 5 is a rear exploded view of the actuator-clamp assembly of FIG. 3.

Referring to FIGS. 3-5, each actuator-clamp assembly 130 has one or more jaw assemblies 170. In addition, each actuator-clamp assembly 130 has a multi-axis actuator 138 coupling the one or more jaw assemblies 170 to the strongback 120. Each jaw assembly 170 is configured to clamp onto a localized segment 302 (FIGS. 16-17) of the workpiece 300. In the example shown, each actuator-clamp assembly 130 has two jaw assemblies 170 mounted on opposite ends of a jaw mounting bar 162. As described in greater detail below, each jaw assembly 170 includes a fixed jaw 172, a movable jaw 174, and a jaw actuator 176 for actuating the movable jaw 174.

The multi-axis actuator 138 of each actuator-clamp assembly 130 couples the one or more jaw assemblies 170 to the strongback 120. As shown in FIGS. 3-4, each multi-axis actuator 138 includes a lower adapter plate 136 and an upper adapter plate 134. The lower adapter plate 136 is coupled to a load cell 160, which is coupled to the jaw mounting bar 162. The upper adapter plate 134 is coupled to an actuator mounting fixture 132, which is coupled to the strongback 120 via mechanical fasteners (not shown) engaged to the lengthwise grooves 122 in the strongback 120.

Figure 8:
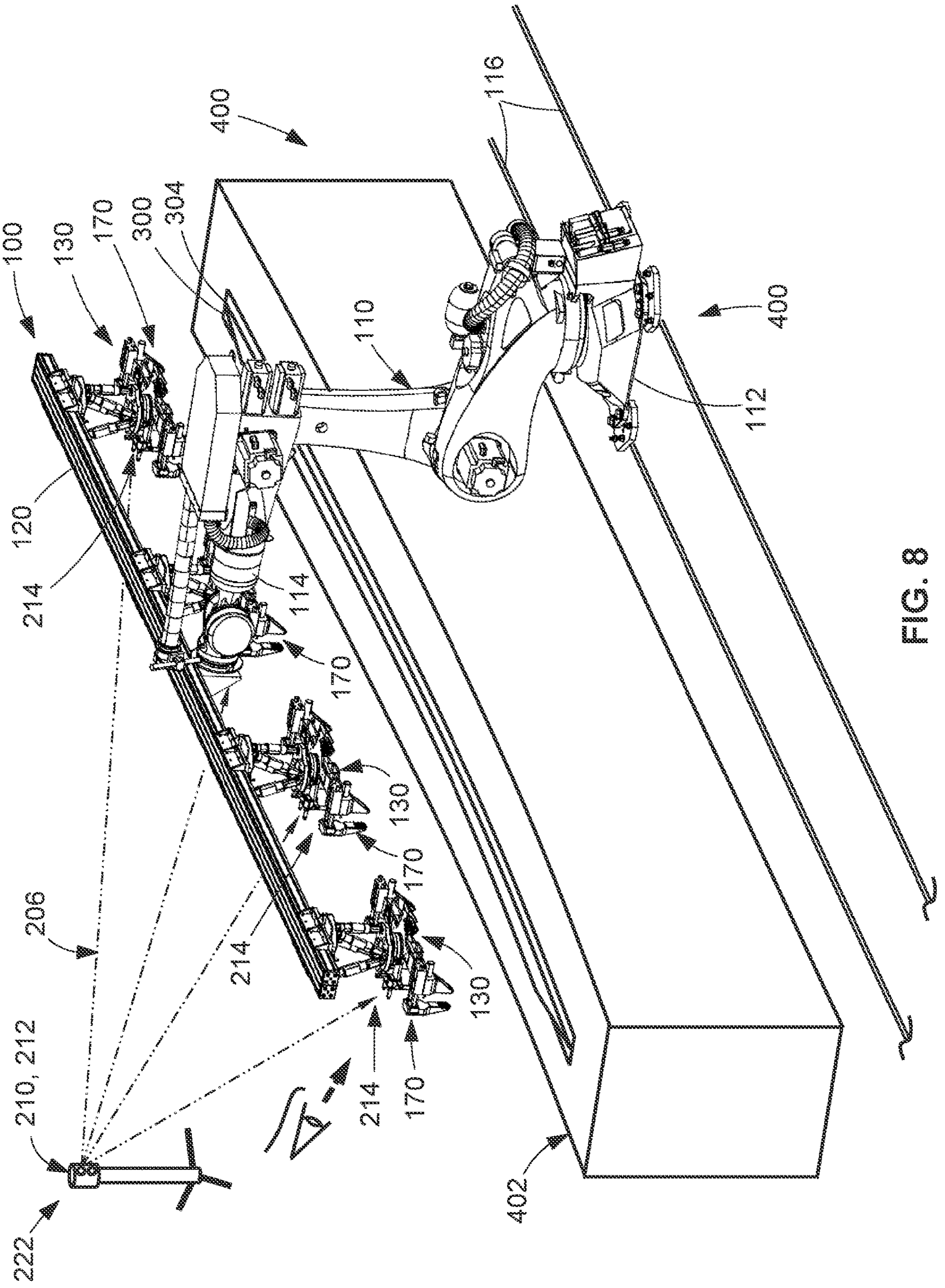
FIG. 8 shows an example of the pick-and-place system positioned adjacent to a stringer trim tool in preparation for picking up a stringer, and further illustrating a tracking device for tracking the spatial position and orientation of the jaw assemblies during the pick-up, orientation, and placement of the stringer.

The multi-axis actuator 138 of each actuator-clamp assembly 130 is independently controlled by the controller 102 (FIGS. 16-17) for adjusting the position and orientation of the pair of jaw assemblies 170. For example, as described below, the multi-axis actuators 138 of the pick-and-place system 100 are actuated in a manner to adjust the orientation of the jaw assemblies 170 prior to clamping respectively onto the localized segment 302 (FIGS. 16-17) of the workpiece 300 for pickup from a workpiece pickup station 400 (FIG. 8). After the workpiece 300 is picked up by the pick-and-place system 100, the multi-axis actuators 138 are independently controlled to adjust the position and orientation of the respective localized segments 302 of the workpiece 300 prior to placement onto a mating structure 410 (FIG. 20) via coordinated operation of the robotic device 110 (FIG. 8) and the plurality of actuator-clamp assemblies 130 under control of the controller 102, as described in greater detail below.

In FIGS. 3-4, the multi-axis actuator 138 of each actuator-clamp assembly 130 is a 6-axis hexapod 140 having 6 linear actuators 142. The linear actuators 142 are operated in a coordinated manner to adjust the position and orientation of the one or more jaw assemblies 170 of the actuator-clamp assembly 130 with 6 degrees of freedom. For example, as shown in FIG. 3, the 6-axis hexapod 140 is configured to effectuate translation and rotation of the jaw assemblies 170 of the actuator-clamp assembly 130 about axes (not shown) that are parallel to a roll axis 144 (x-axis), a pitch axis 146 (y-axis), and a yaw axis 148 (z-axis) of the actuator-clamp assembly 130. The linear actuators 142 can be electromechanical actuators, configured to provide precise control of the position and orientation of the jaw assemblies 170. However, in other examples, the linear actuators 142 can be pneumatic actuators, hydraulic actuators, or other actuator types. In still other examples, the multi-axis actuators 138 can be provided in any one of a variety of alternative configurations capable of adjusting the orientations of their respective jaw assemblies 170, and are not limited to 6-axis hexapods 140.

Referring to FIGS. 3-5, each actuator-clamp assembly 130 includes the above-mentioned load cell 160, which is interposed between the multi-axis actuator 138 and the jaw assemblies 170 of the actuator-clamp assembly 130. In the example shown, the load cell 160 is an Omega 160 Force-Torque Sensor, commercially available from ATI Industrial Automation, Apex, NC. However, the load cell 160 may be provided in any one of a variety of alternative sizes, shapes, and configurations, and is not limited to the example shown in the figures. Regardless of its configuration, each load cell 160 is configured to continuously measure torque and force on a respective localized segment 302 (FIGS. 16-17) of the workpiece 300. The load cell 160 of each actuator-clamp assembly 130 converts mechanical loads into forces and torques, and simultaneously measures forces along the roll axis 144, pitch axis 146, and yaw axis 148 of the actuator-clamp assembly 130, and torques about the roll axis 144, pitch axis 146, and yaw axis 148 (FIG. 3).

Figure 25:
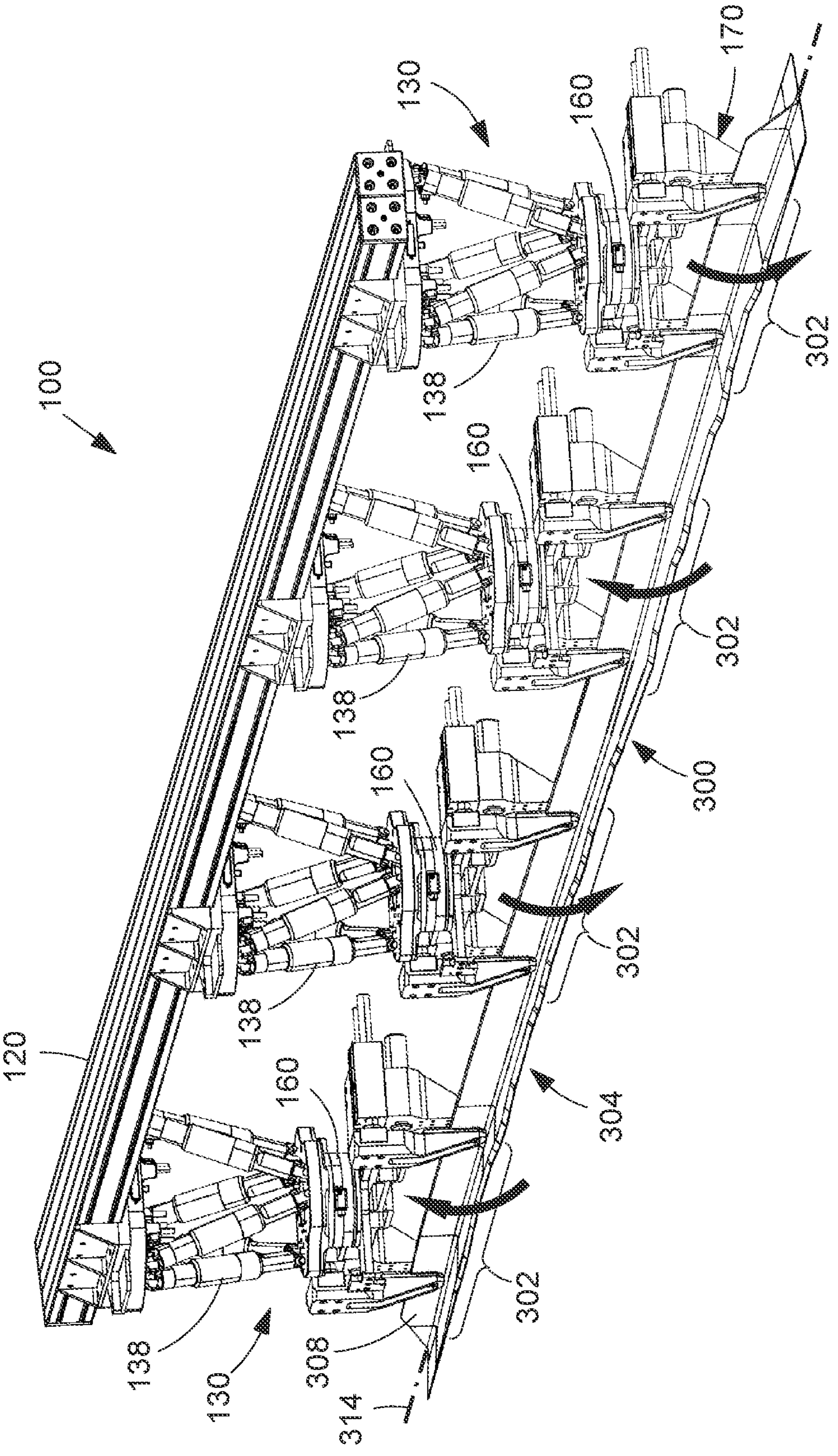
FIG. 25 shows the re-orientation of each actuator-clamp assembly in a manner to twist the stringer such that the loft angle of each localized segment matches the lot angle of the mating structure.
Figure 26:
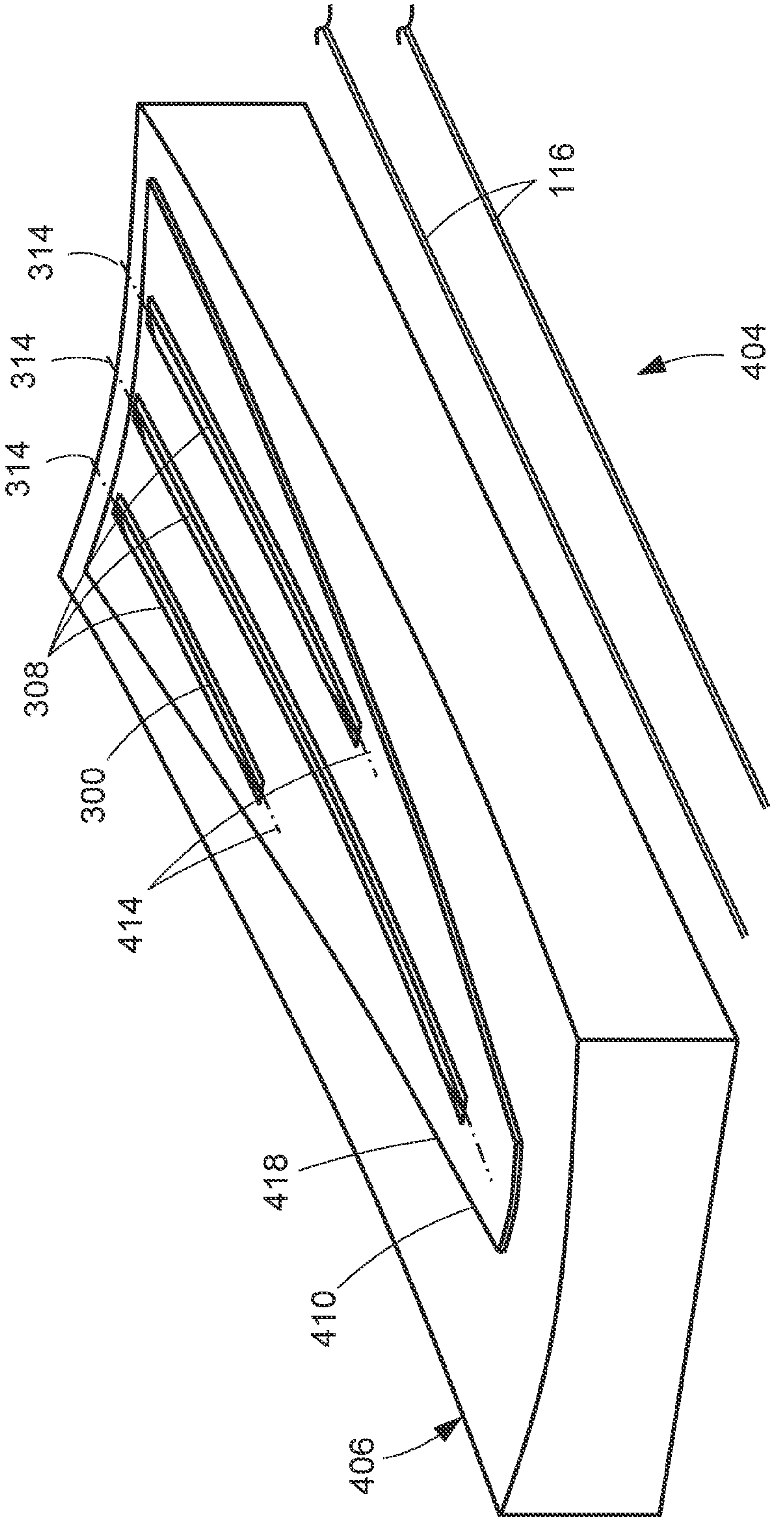
FIG. 26 is a perspective view showing the stringer placed on the wing panel such that the actual centerline is aligned with the intended centerline.

In the context of stringer placement, the load cells 160 measure torque on the stringer 304 (FIG. 25) when manipulated (e.g., twisted) in a manner to adjust the workpiece loft angle 316 (FIG. 22) of the mating surface 312 of the localized segments 302 (FIG. 25) of the stringer 304 to match the local loft angles 416 (FIG. 22) of the mating surface 412 of the mating structure 410 (e.g., the wing panel 418). In addition to measuring torque on the workpiece 300, each load cell 160 is configured to measure force, such as compaction pressure applied by the localized segments 302 of the workpiece 300 onto the mating structure 410. Each load cell 160 is configured to transmit (e.g., continuously) signals representative of the torque and force measurements to the controller 102.

In response to the torque and force measurements from the load cells 160, the controller 102 controls the robotic device 110 and the multi-axis actuators 138 in a manner reducing the risk of damage to the workpiece 300 and/or damage to the mating structure 410 during the pick-up, manipulation, and placement of the workpiece 300. For example, the controller 102 uses torque measurements from the load cells 160 to control the multi-axis actuators 138 in a manner to maintain the creep rate of the workpiece material below a predetermined maximum allowable creep rate during manipulation of the workpiece 300. In the example of a pre-cured composite stringer 304 comprised of composite plies 310 (FIG. 28), torque measurements from the load cells 160 enable the controller 102 to monitor the twisting force (i.e., torque) on the stringer 304 as the localized segments 302 (FIG. 25) are rotated into a workpiece loft angle 316 (FIG. 22) that matches the local loft angle 416 (FIG. 22) of the mating structure 410. In this regard, the controller 102 controls the multi-axis actuators 138 to twist the workpiece 300 at a rate that allows sufficient time for the composite plies 310 to slip relative to each other, and thereby avoids ply buckling, ply wrinkling, or other anomalies that may otherwise occur due to an excessively high creep rate.

In addition to maintaining the creep rate of the workpiece 300 below a predetermined maximum, the controller 102 is configured to use force measurements from the load cells 160 to controls the robotic device 110 in a manner to maintain compaction pressure on the workpiece 300 below a predetermined maximum during placement on the mating structure 410. In the context of the stringer 304, the robotic device 110 and the actuator-clamp assemblies 130 are controlled in a manner to place the composite stringer 304 on the wing panel 418 with a compaction pressure that avoids damage to both the stringer 304 and the wing panel 418, which may otherwise occur due to excessive compaction pressure.

Referring to FIGS. 3-7, the jaw assemblies 170 of each actuator-clamp assembly 130 are mounted to the jaw mounting bar 162. In the example shown, the fixed jaws 172 are integral with the jaw mounting bar 162. However, in other examples not shown, the fixed jaws 172 can be removably coupled to the actuator-clamp assembly 130. The jaw actuator 176 is configured to translate the movable jaw 174 toward and away from the fixed jaw 172 for clamping and unclamping the workpiece 300 between the movable jaw 174 and the fixed jaw 172. In the example shown, the jaw actuator 176 is a pneumatic actuator, which is fluidically coupled to an air regulator (not shown). Under command of the controller 102, the air regulator regulates the supply of air pressure to the jaw actuator 176, for controlling translation of the movable jaw 174 toward and away from the fixed jaw 172. In addition, the air regulator regulates the amount of clamping pressure applied to the workpiece 300 when clamped between the movable jaw 174 and the fixed jaw 172.

Figure 24:
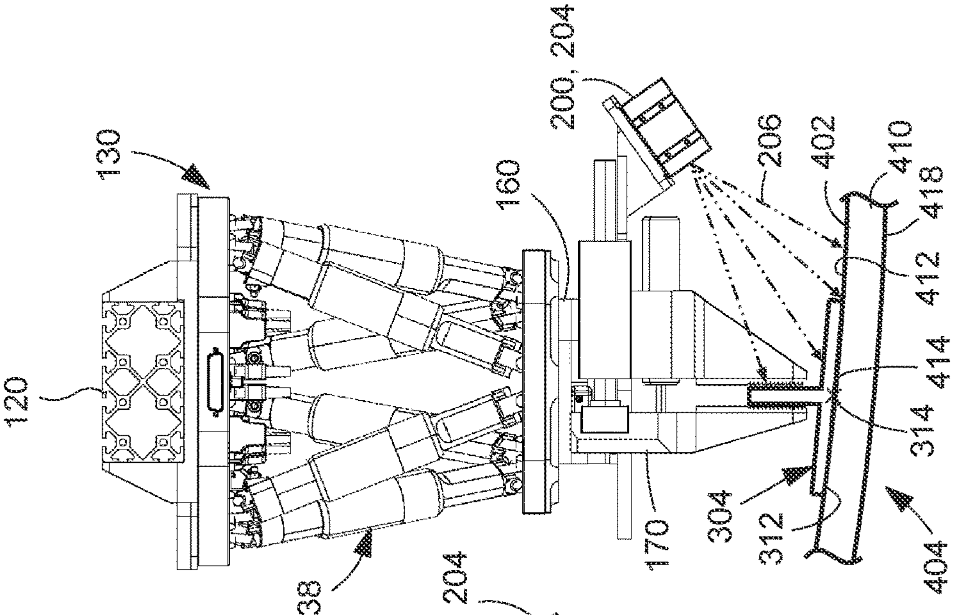
FIG. 24 shows the actuator-clamp assembly placing the stringer on the wing panel such that the actual centerline of the stringer is aligned with an intended centerline of the stringer on the wing panel.
Figure 23:
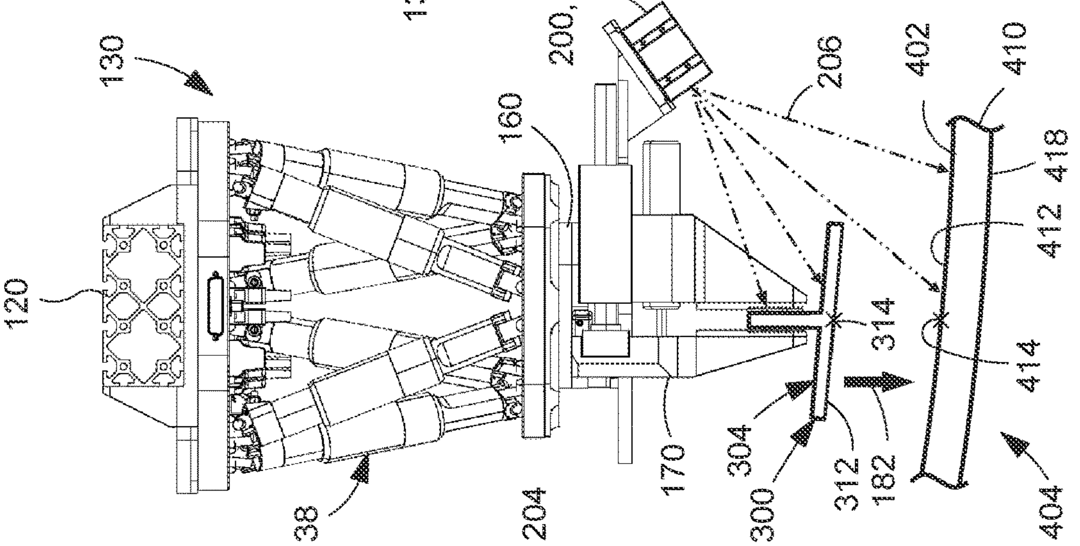
FIG. 23 shows the multi-axis actuator of FIG. 22 orienting a jaw assembly such that the loft angle of the mating surface of the stringer matches the loft angle of the mating surface of the wing panel.

Referring to FIGS. 6, 7, 15, and 23, each jaw assembly 170 includes a pair of one-way gripper pads 178 respectively mountable to the movable jaw 174 and the fixed jaw 172. The gripper pads 178 are configured to grip the workpiece 300 while resisting sliding movement of the workpiece 300 between the gripper pads 178 in a placement direction 182 (FIG. 23) toward the mating structure 410 (FIG. 24). In this regard, the gripper pads 178 prevent the workpiece 300 from slipping downwardly out from between the movable jaw 174 and the fixed jaw 172 when the workpiece 300 is picked up from the workpiece pickup station 400 (FIG. 15), and when moved to the workpiece placement station 404 and manipulated (e.g., twisted) in three-dimensional space (FIG. 25) prior to placement on the mating structure 410. The gripper pads 178 are also configured to allow limited sliding movement of the workpiece 300 between the movable jaw 174 and fixed jaw 172 in a direction opposite the placement direction 182 when the workpiece 300 is placed in contact with the mating structure 410, as shown in FIG. 23. In this regard, the one-way gripper pads 178 allow some degree of compliance when placing the workpiece 300 on the mating structure 410, and thereby prevent damage to the workpiece 300 and/or the mating structure 410 that may otherwise occur due to excessive compaction pressure.

Figure 7:
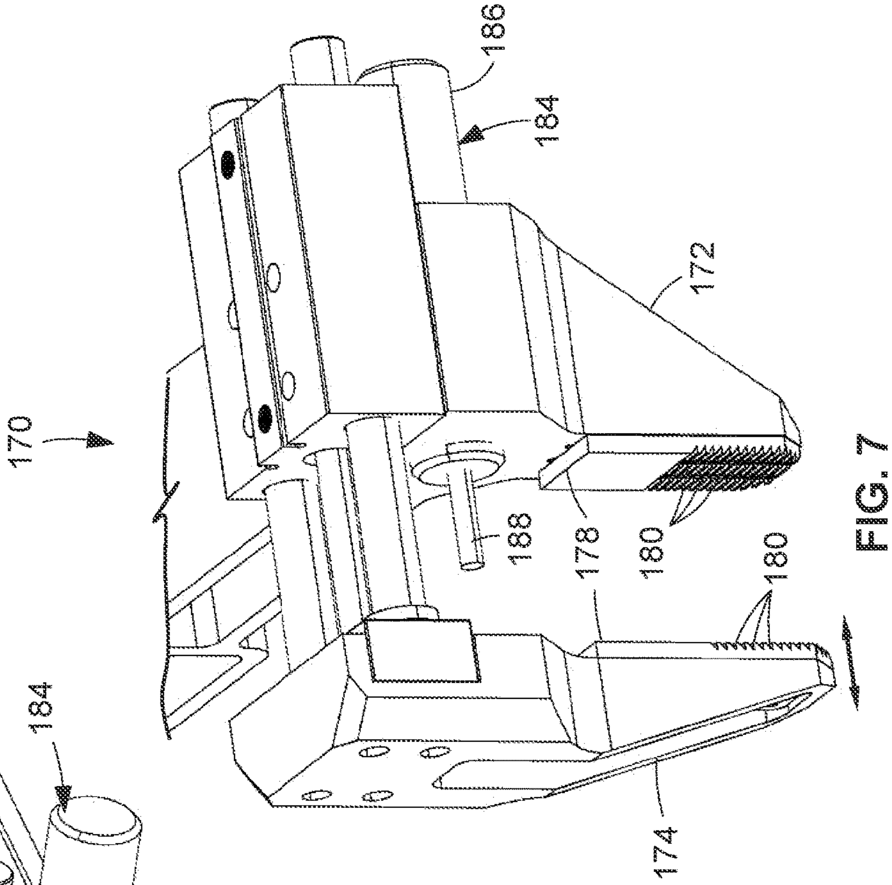
FIG. 7 is a further perspective view of the jaw assembly of FIG. 6.
Figure 6:
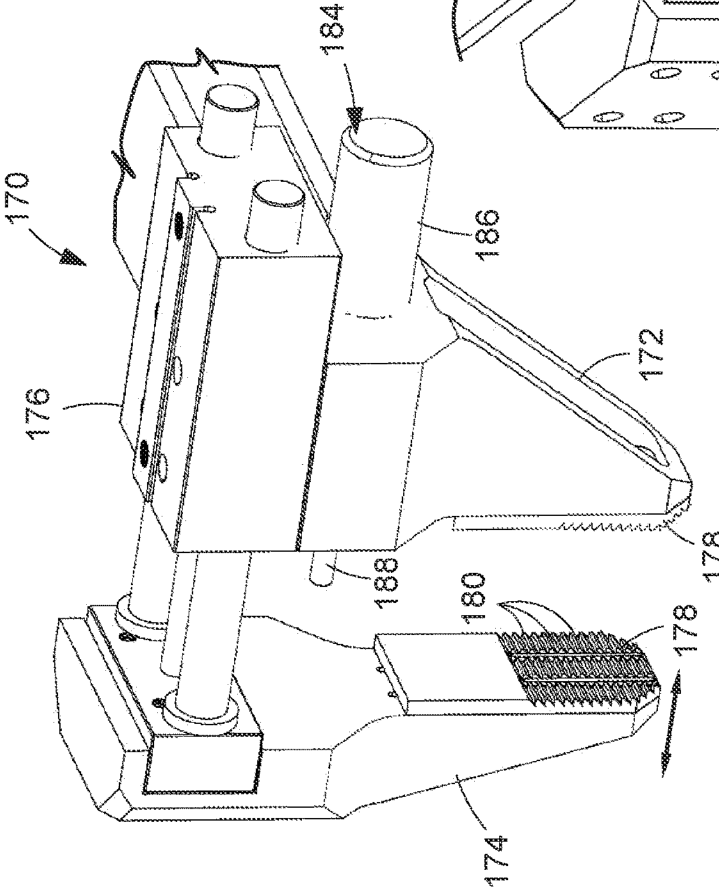
FIG. 6 is a perspective view of an example of a jaw assembly comprising a fixed jaw, a movable jaw, and a jaw actuator for moving the movable jaw toward and away from the fixed jaw for clamping and clamping the workpiece.

In the example of FIGS. 6-7, each one-way gripper pad 178 has a plurality of protrusions 180 which are shown as rib segments. However, in other examples, the gripper pads 178 can include barbs, spikes, or other mechanical features configured to grip the surfaces of the workpiece 300 (e.g., the surfaces of the web 308) and allow a limited amount of slippage of the workpiece 300 between the gripper pads 178 in a direction opposite the placement direction 182. In one example, the protrusions 180 of each gripper pad 178 can be oriented at an angle of 30-60 degrees from perpendicular to the direction of motion of the movable jaw 174 relative to the fixed jaw 172. However, the one-way gripper pads 178 can be provided with mechanical features having any one of a variety of alternative sizes, shapes and configurations capable of gripping the surfaces of the workpiece 300 in the manner described above.

In FIGS. 6-7, each jaw assembly 170 includes a shock absorber 184 mounted to the jaw mounting bar 162. The shock absorber 184 includes a cylinder 186, and a piston 188 extending from the cylinder 186 toward the movable jaw 174. The shock absorber 184 can be pneumatic and/or can include a mechanical spring (not shown) for biasing the piston 188 outwardly toward the movable jaw 174. When the movable jaw 174 contact the piston 188 as the movable jaw 174 moves toward the fixed jaw 172, the shock absorber 184 is configured to decelerate or reduce the closing rate of the movable jaw 174 prior contacting the workpiece 300. In addition, the shock absorber 184 is configured to continuously measure clamping pressure exerted on the workpiece 300 between the movable jaw 174 and the fixed jaw 172, for feedback to the jaw actuator 176. The jaw actuator 176, under control of the controller 102, maintains the clamping pressure below a predetermined maximum, and thereby reduces the risk of damage to the workpiece 300 (i.e., a pre-cured composite stringer) from excessive clamping pressure.

Referring to FIGS. 4-5, 11-15, and 21-24 each actuator-clamp assembly 130 includes at least one workpiece orientation measuring device 200, mountable proximate the one or more jaw assemblies 170. In the example shown, each actuator-clamp assembly 130 has a pair of workpiece orientation measuring devices 200 (e.g., a pair of laser profilometers 204) located respectively proximate the pair of jaw assemblies 170 of the actuator-clamp assembly 130. The pair of workpiece orientation measuring devices 200 of each actuator-clamp assembly 130 are configured to measure the orientation and position of a localized segment 302 (FIGS. 16-17) of the workpiece 300 relative to the actuator-clamp assembly 130. Measurements from the workpiece orientation measuring devices 200 are transmitted to the controller 102, which uses the orientation and position measurements to control the robotic device 110 and the multi-axis actuators 138 during the performance of several operations.

Figure 15:
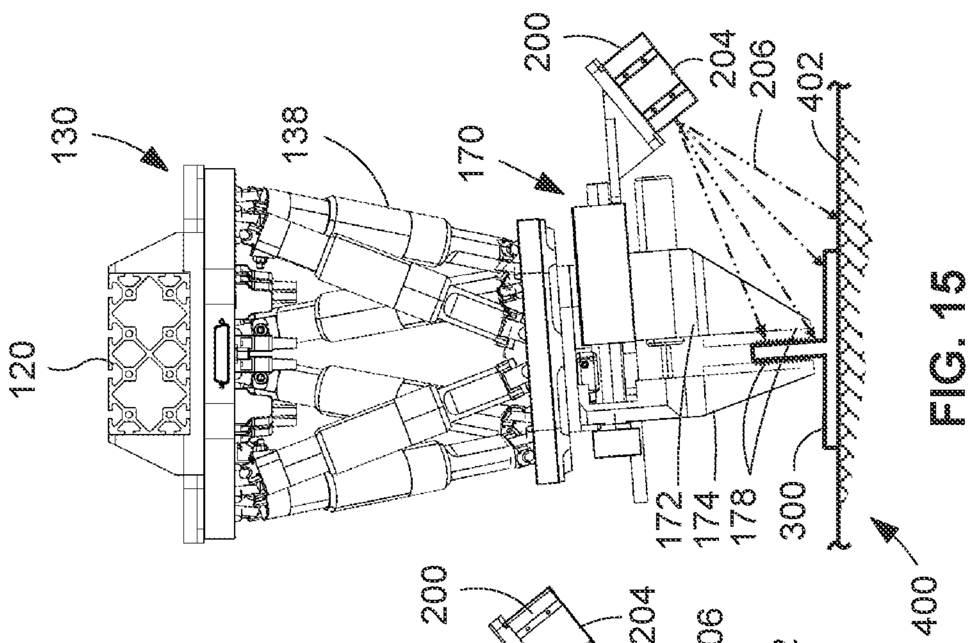
FIG. 15 shows a jaw assembly clamping onto the stringer prior to picking up the stringer off the stringer trim tool.

For example, prior to clamping onto the workpiece 300 at the workpiece pickup station 400 (e.g., the stringer trim tool 402), the controller 102 uses measurements from the workpiece orientation measuring devices 200 to independently control each multi-axis actuator 138 in a manner to rotate the respective jaw assembly 170 about the pitch axes 146 (FIG. 3) until the jaw assemblies 170 of each actuator-clamp assembly 130 are aligned with the respective localized segments 302 (FIGS. 16-17), as shown in FIGS. 11-14. In addition, the controller 102 uses the measurements from the workpiece orientation measuring devices 200 to control the robotic arm 114 (FIG. 8) for lowering the strongback 120 into a position where the jaw assemblies 170 can clamp onto the workpiece 300 for pickup, as shown in FIG. 15.

Figure 16:
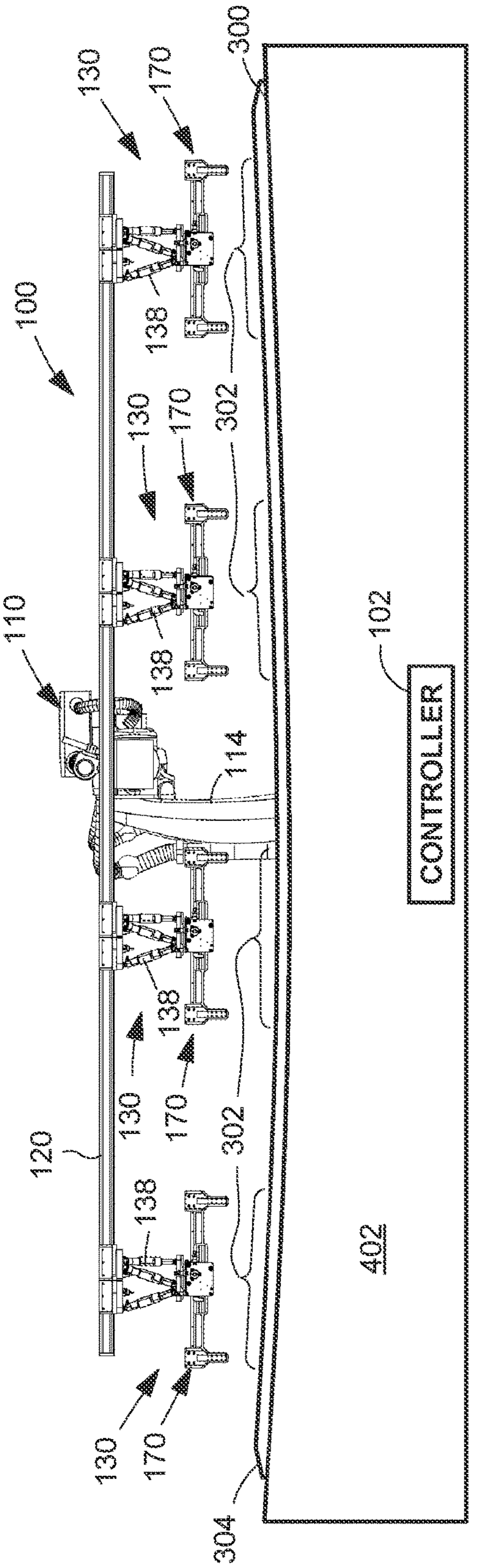
FIG. 16 is a front view of the pick-and-place system prior to engaging the stringer on the stringer trim tool.
Figure 17:
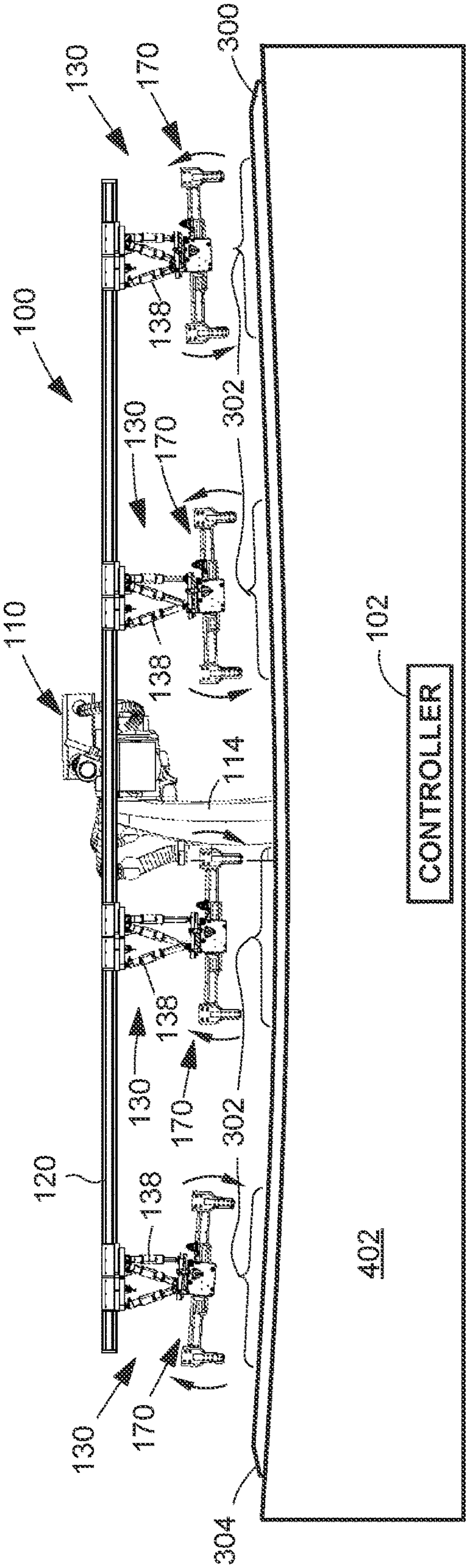
FIG. 17 shows the orientation of the jaw assemblies of each actuator-clamp assembly to match the orientation of the respective localized segments of the stringer prior to pick up.

In FIGS. 16-17, prior to lowering the strongback 120 for clamping onto the workpiece 300, the controller 102 can use the measurements from the workpiece orientation measuring devices 200 (FIG. 11) to control each multi-axis actuator 138 in a manner to rotate the respective jaw assemblies 170 about the their respective roll axes 144 (FIG. 3) until the jaw assemblies 170 of each actuator-clamp assembly 130 are oriented complementary to any spanwise curvature that may exist in the workpiece 300, when viewed from the front (e.g., FIGS. 16-17). For example, prior to clamping onto the stringer 304, measurements from the pair of workpiece orientation measuring devices 200 of each actuator-clamp assembly 130 are used by the controller 102 to independently control the multi-axis actuator 138 in a manner to rotate the jaw assemblies 170 of the actuator-clamp assemblies 130 about their roll axis 144 (FIG. 3) so that each jaw assembly 170 will clamp onto the stringer 304 at approximately the same depth on the web 308. The controller 102 can also use measurements from the workpiece orientation measuring devices 200 to control each multi-axis actuator 138 in a manner to rotate the respective jaw assemblies 170 about their yaw axes 148 (FIG. 3) so that the orientation of each pair of jaw assemblies 170 matches any spanwise curvature (not shown) that may exist in the stringer 304 when viewed from a top-down direction (not shown).

Referring to FIGS. 21-25, measurements from the workpiece orientation measuring devices 200 can also be used by the controller 102 to independently control the multi-axis actuators 138 of the actuator-clamp assemblies 130 to manipulate the workpiece 300 while supported in three-dimensional space. More specifically, the multi-axis actuators 138 can manipulate the workpiece 300 (e.g., FIGS. 22-23) into its net shape geometry prior to placing the workpiece 300 on the mating structure 410 (FIG. 24). For example, one or more of the multi-axis actuators 138 can rotate their respective jaw assemblies 170 about their respective pitch axes 146 (FIG. 3) in order to twist the workpiece 300 until the workpiece loft angle 316 of the workpiece mating surface 312 of each localized segment 302 (FIG. 25) matches (e.g., within 0.5 degrees) the local loft angle 416 of the mating surface 412 (e.g., the inner mold line 420) of the mating structure 410 (e.g., the wing panel 418).

In addition to manipulating the workpiece 300 into its net shape geometry, measurements from the workpiece orientation measuring devices 200 are also used by the controller 102 to control the multi-axis actuators 138 to precisely place the workpiece 300 on the mating structure 410 in a manner such that an actual centerline 314 of the workpiece 300 is aligned (e.g., within 0.10 inch) with an intended centerline 414 of the workpiece 300 on the mating structure 410, as shown in FIGS. 23-24 and described below. In the context of the present disclosure in which the workpiece 300 is a stringer 304 and the mating structure 410 is a wing panel 418, the actual centerline 314 (FIGS. 21-24) of the workpiece 300 is located at the intersection of the mid-plane (e.g., web centerline—not shown) of the web 308 and the underside of the flange 306. As indicated above, the underside of the flange 306 is the mating surface 312 of the stringer 304. The intended centerline 414 (FIGS. 21-24) of the stringer 304 is the as-designed location of the stringer 304 on the inner mold line 420 (i.e., the mating surface 412) of the wing panel 418 (i.e., the mating structure 410).

In the example of FIGS. 4-5, each workpiece orientation measuring device 200 is a laser profilometer 204. However, the workpiece orientation measuring devices 200 can be provided in any one of a variety of alternative configurations that operate under any one of a variety of different modalities capable of generating measurements of the orientation and position of the localized segments 302 of the workpiece 300 relative to the actuator-clamp assemblies 130 and relative to each other and the workpiece placement station 404.

Figure 11:
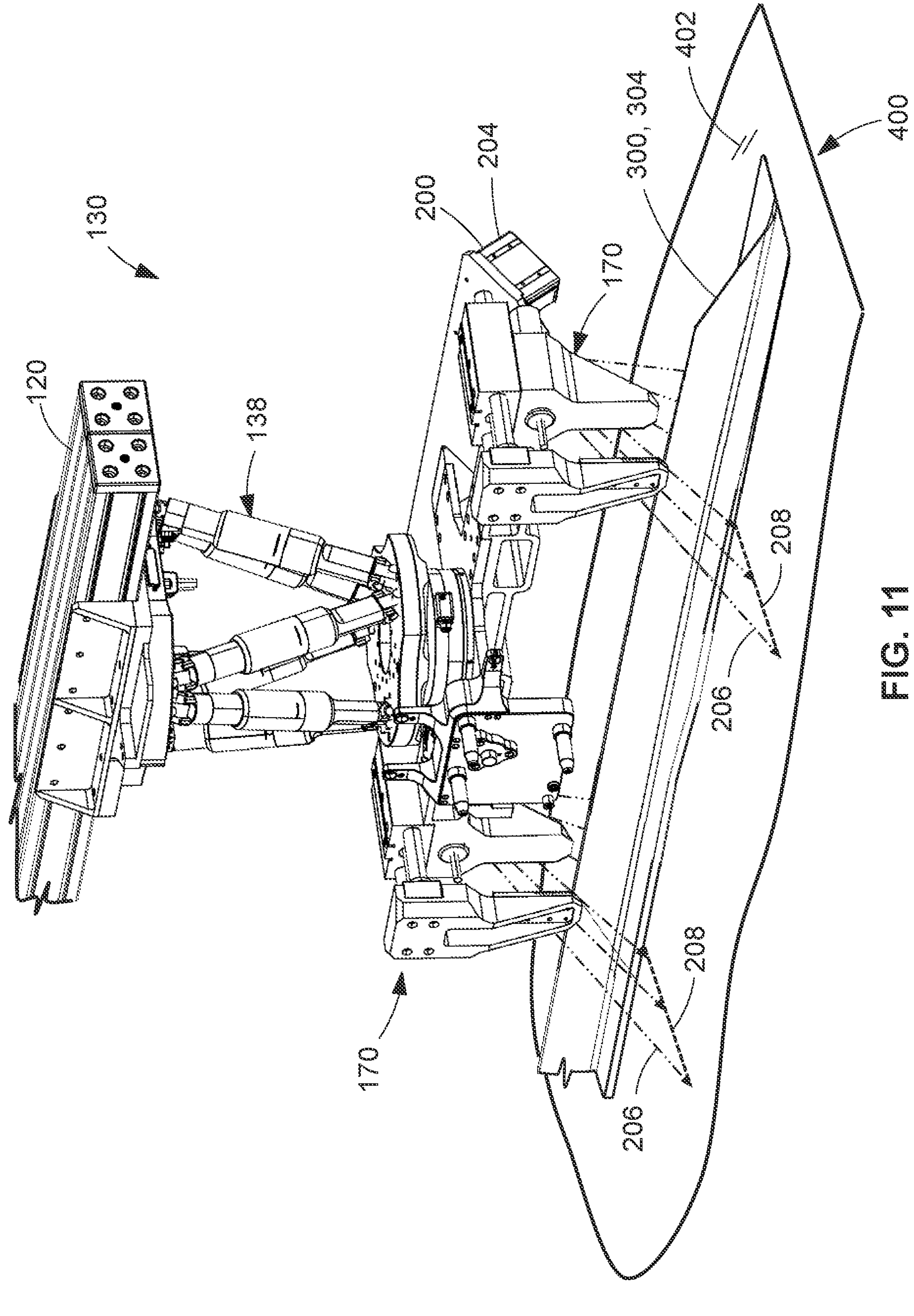
FIG. 11 is a front perspective view of an actuator-clamp assembly positioned over a stringer, and illustrating laser bands emitted by a pair of workpiece orientation measuring devices (e.g., laser profilometers) for measuring the orientation and position of the workpiece relative to the actuator-clamp assembly.
Figure 12:
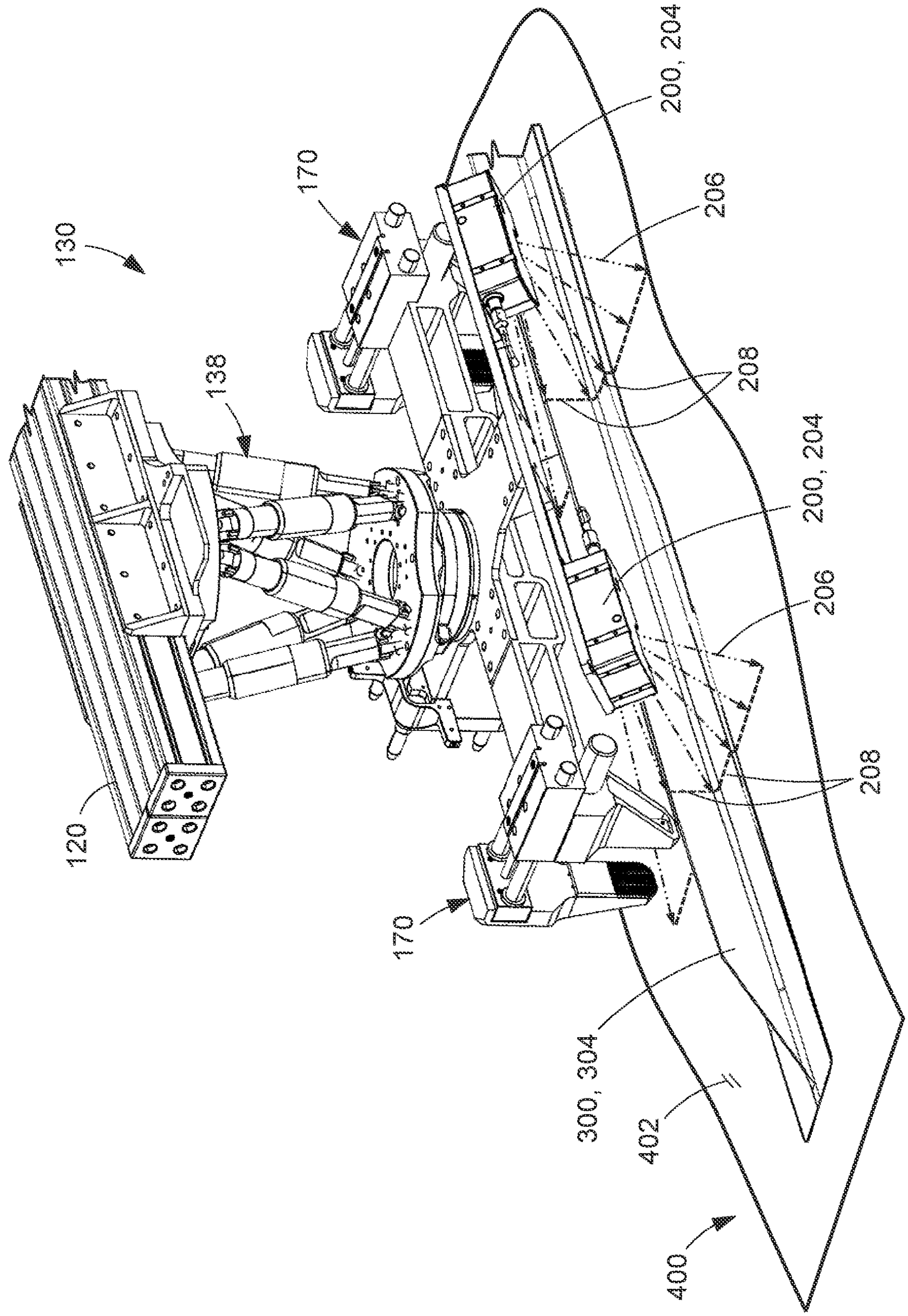
FIG. 12 is a rear perspective view of the actuator-clamp assembly of FIG. 11.
Figure 14:
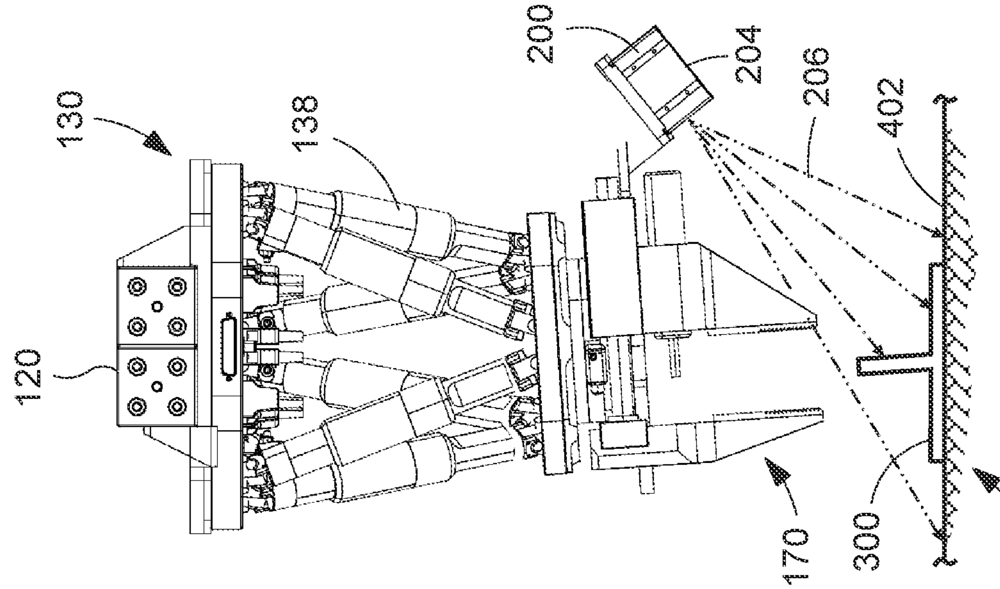
FIG. 14 shows the multi-axis actuator of FIG. 13 orienting a jaw assembly to match the orientation of the stringer web.
Figure 13:
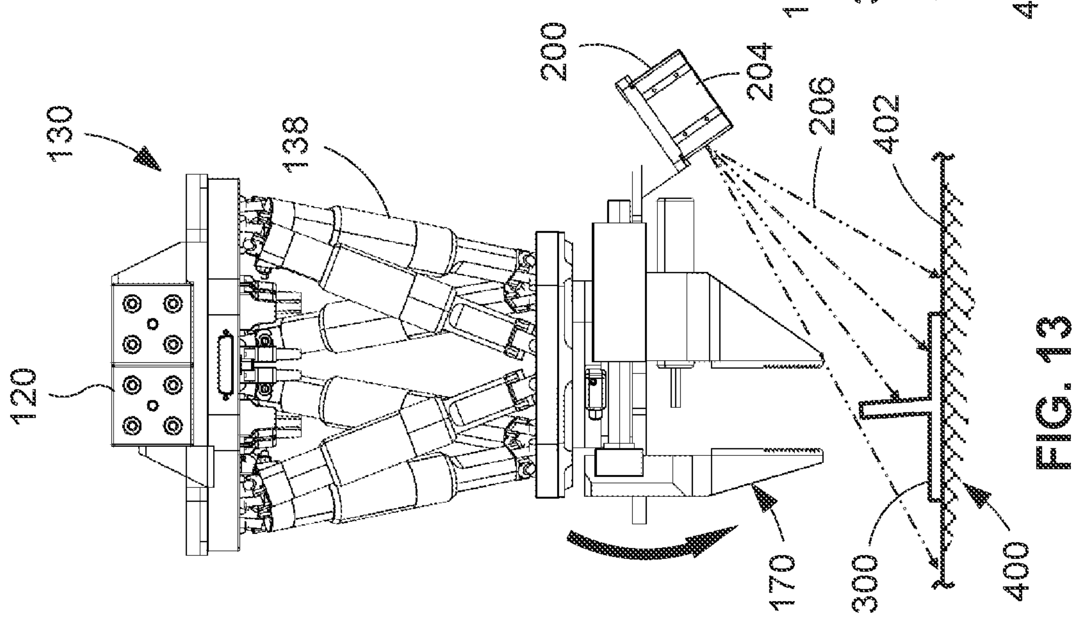
FIG. 13 is a side view of the actuator-clamp assembly of FIG. 11 and illustrating the laser band emitted by the laser profilometer for measuring the orientation and/or position of a localized segment of the stringer relative to the jaw assemblies.

In the example pick-and-place system 100 of FIGS. 4-5, the pair of laser profilometers 204 of each actuator-clamp assembly 130 are coupled to a workpiece orientation measuring device mounting fixture 202, which is coupled to the jaw mounting bar 162. Each laser profilometer 204 is configured to emit a laser beam 206 (e.g., a laser band) as shown in FIGS. 11-12. Each laser profilometer 204 is mounted such that its laser beam 206 will be incident on the surfaces of both the workpiece 300 and the workpiece pickup station 400 when the robotic arm 114 lowers the jaw assemblies 170 into close proximity to the workpiece 300 in preparation for pickup, as shown in FIGS. 13-14. Similarly, in preparation for placement on the mating structure 410 at the workpiece placement station 404, the laser profilometers 204 are mounted such that the laser beams 206 will be incident on the workpiece 300 and the mating structure 410 when the workpiece 300 is lowered into close proximity to the mating structure 410. Each laser beam 206 results in a laser profile 208 (e.g., FIGS. 11, 12, and 22) on the surfaces of the workpiece 300, the workpiece pickup station 400, and/or the mating structure 410.

Based on the laser profiles 208, measurements are generated (e.g., by the controller 102) regarding the position and orientation of the workpiece 300 (e.g., the stringer). For example, in preparation for picking up the workpiece 300 from the workpiece pickup station 400 (e.g., the stringer trim tool 402), the laser profiles 208 (e.g., FIGS. 11-12) facilitate the generation of measurements of the orientation and position of the workpiece 300 relative to the actuator-clamp assemblies 130. Such measurements are used by the controller 102 to control the multi-axis actuators 138 in a manner to rotate the respective jaw assemblies 170 about their respective roll axes 144, pitch axes 146, and/or yaw axes 148, as described above, until the jaw assemblies 170 are oriented complementary to the workpiece 300, thereby enabling the jaw assemblies 170 to clamp onto the workpiece 300 at the workpiece pickup station 400, as shown in FIGS. 13-15. After picking up the workpiece 300, the robotic device 110 is commanded by the controller 102 to move the workpiece 300 from the workpiece pickup station 400 to the workpiece placement station 404 as shown in FIGS. 18-20 and described below.

Referring to FIGS. 21-24, at the workpiece placement station 404, the laser beams 206 from the laser profilometers 204 result in laser profiles 208 on the workpiece 300 and on the mating structure 410. The laser profiles 208 (e.g., FIG. 21) facilitate the generation of measurements regarding the orientation and position of the localized segments 302 of the workpiece 300 relative to the mating structure 410. For example, the laser profiles 208 on the web 308 provide the ability to locate the web mid-plane (e.g., web centerline—not shown) prior to place of the workpiece 300 on the mating structure 410. Such measurements are also used by the controller 102 to control the multi-axis actuators 138 in a manner to rotate the respective jaw assemblies 170 about their respective roll axes 144, pitch axes 146, and/or yaw axes 148 (FIG. 3) to manipulate the workpiece 300 into a geometry shape that is complementary to the mating structure 410. For example, measurements from the laser profilometers 204 are used by the controller 102 to control the multi-axis actuators 138 in a manner to rotate the jaw assemblies 170 about their respective pitch axes 146 in order to twist the workpiece 300 until the workpiece loft angle 316 of each localized segment 302 matches the local loft angle 416 of the mating structure 410, as shown in FIGS. 21-24 and described above.

Figure 9:
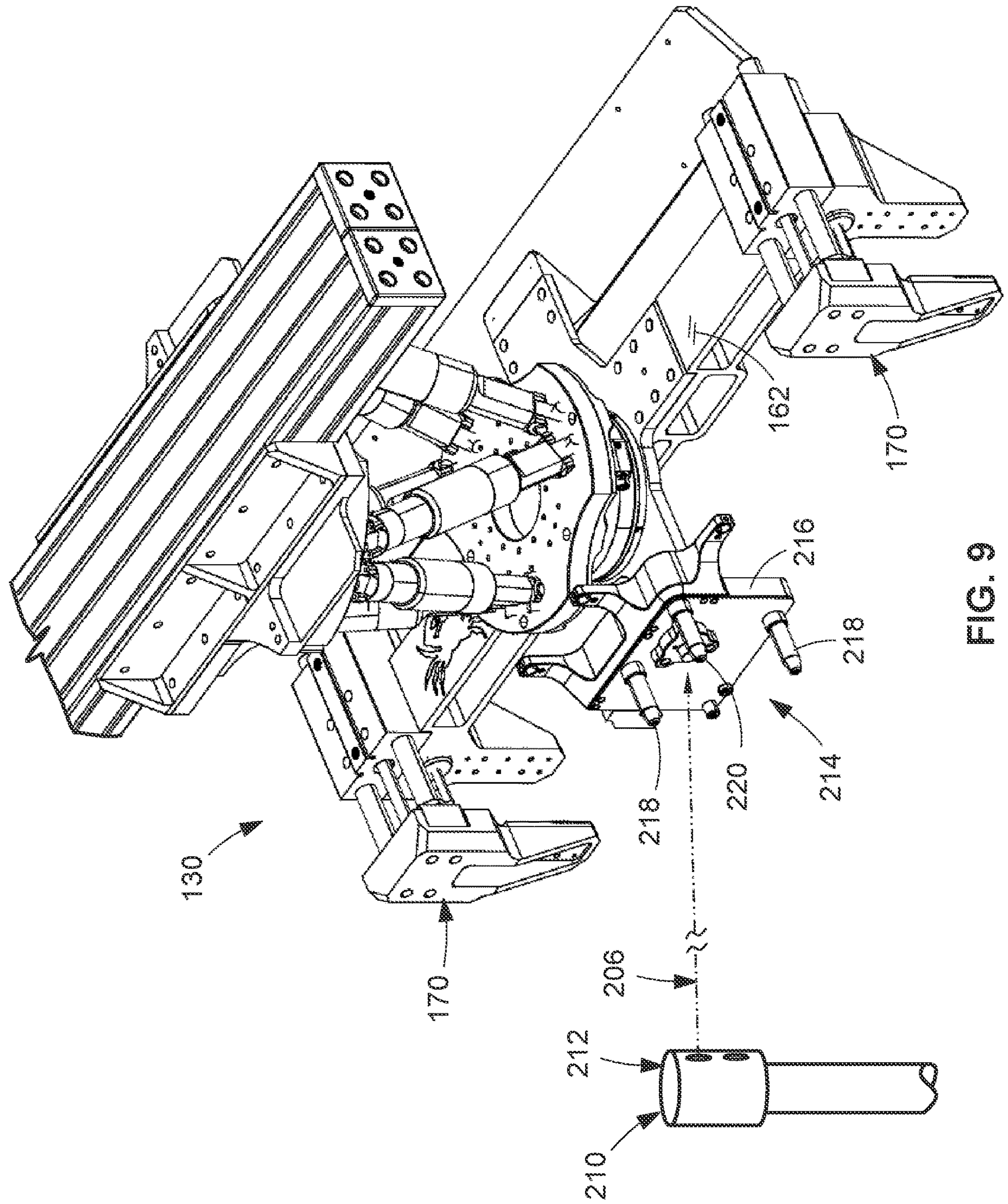
FIG. 9 is a magnified view of an actuator-clamp assembly having a tracking fixture for tracking by the tracking device.
Figure 10:
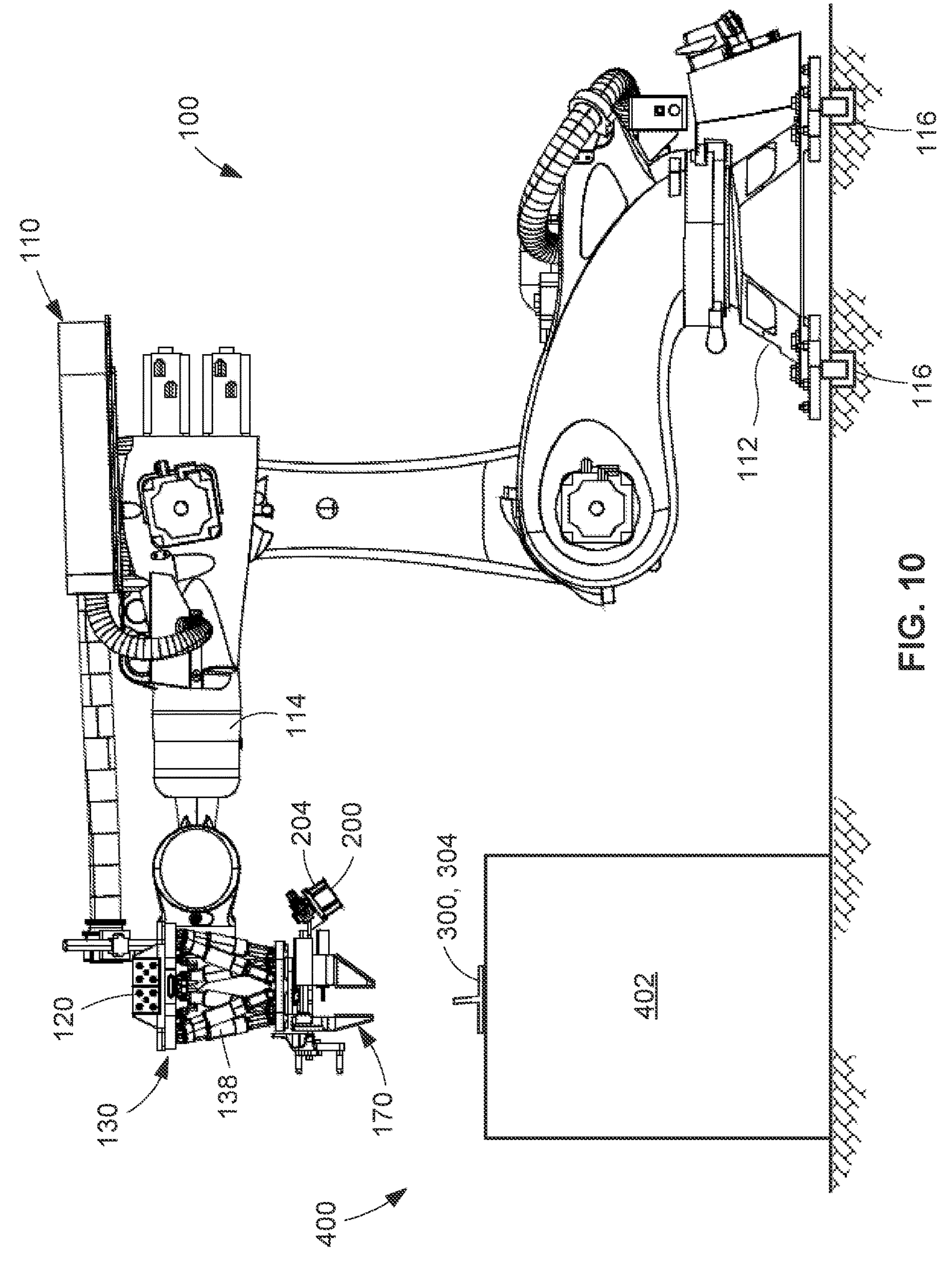
FIG. 10 is a side view of the pick-and-place system positioned adjacent to the stringer trim tool of Figure.

Referring briefly to FIGS. 8-9, the pick-and-place system 100 includes a tracking system 222 comprising a tracking device 210 and a plurality of tracking fixtures 214. The tracking device 210 can be positioned within the production cell (e.g., on the shop floor) at a location that provides the tracking device 210 with line-of-sight access to the workpiece pickup station 400, the workpiece placement station 404, and the pick-and-place system 100. The plurality of tracking fixtures 214 are respectively mounted to the plurality of actuator-clamp assemblies 130. In the example of FIG. 9, each actuator-clamp assembly 130 has a tracking fixture 214 mounted on the jaw mounting bar 162. Each tracking fixture 214 is approximately centered between the jaw assemblies 170 of the actuator-clamp assembly 130. Each tracking fixture 214 includes a tracking plate 216 having one or more tracking pins 218 and tracking reflectors 220.

Although not shown, tracking pins 218 and tracking reflectors 220 can also be mounted on the workpiece pickup station 400 (e.g., the stringer trim tool 402) and on the workpiece placement station 404 (e.g., the wing assembly tool 406) at locations that provide line-of-sight with the tracking device 210. In the example shown, the tracking device 210 is a laser tracker 212 configured to emit a laser beam 206 that interacts with the tracking pins 218 and tracking reflectors 220 of the actuator-clamp assemblies 130, and any tracking pins 218 and/or tracking reflectors 220 on the workpiece pickup station 400 and the workpiece placement station 404. The interaction of the laser beam 206 with the tracking pins 218 and tracking reflectors 220 allows the tracking system 222 to continuously track the spatial position and orientation of the plurality of actuator-clamp assemblies 130 relative to each other, and relative to the workpiece pickup station 400 and the workpiece placement station 404.

Measurements from the tracking system 222 and the workpiece orientation measuring devices 200 (e.g., laser profilometers 204) are transmitted (e.g., continuously) to the controller 102 to facilitate real-time control of the robotic device 110 and the multi-axis actuators 138, enabling the pick-up, manipulation, and placement of the workpiece 300.

For example, measurements from the tracking system 222 are used by the controller 102 to position the strongback 120 at the workpiece pickup station 400 in preparation for picking up the workpiece 300. In this regard, tracking system measurements are used by the controller 102 to control the movement of the robotic device base 112 (FIG. 8) along the rails 116 (FIG. 8) in order to position the robotic device 110 at the workpiece pickup station 400. Once the robotic device 110 is at the desired location at the workpiece pickup station 400, tracking system measurements are used by the controller 102 to control the movement of the robotic arm 114 to position the strongback 120 at a distance above the workpiece 300 at which the workpiece orientation measuring devices 200 (e.g., laser profilometers 204) can provide measurements of the spatial position and orientation of the jaw assemblies 170 of each actuator-clamp assembly 130, for orienting the jaw assemblies 170 in preparation for clamping onto the workpiece 300, as described above and illustrated in FIGS. 11-17.

Referring to the example of FIGS. 18-24, once the jaw assemblies 170 (FIG. 15) are clamped onto the workpiece 300 (FIG. 15) at the workpiece pickup station 400, measurements from the tracking system 222 are used by the controller 102 to control the robotic arm 114 to lift the workpiece 300 off the workpiece pickup station 400 as shown in FIG. 18. The tracking system measurements are then used by the controller 102 to control the robotic device 110 to move along the rails 116 for transporting the workpiece 300 from the workpiece pickup station 400 to the workpiece placement station 404 as shown in FIG. 19. Once the robotic device 110 is at the desired location at the workpiece placement station 404 as shown in FIG. 20, tracking system measurements are used by the controller 102 to control the movement of the robotic arm 114 to lower the workpiece 300 to a location above the mating structure 410 at which the workpiece orientation measuring devices 200 (e.g., laser profilometers 204) can provide measurements of the spatial position and orientation of the workpiece 300 relative to the mating structure 410. As described above, measurements from the workpiece orientation measuring devices 200 are used by the controller 102 to control the multi-axis actuators 138 to rotate the jaw assemblies 170 in a manner to manipulate the workpiece 300 into a shape complementary to the mating structure 410, and to place the workpiece 300 on the mating structure 410 such that the actual centerline 314 of the workpiece 300 is aligned with the intended centerline 414 of the workpiece 300 on the mating structure 410, as described above and illustrated in FIGS. 22-24.

Referring now to FIG. 29, shown is a flowchart of operations included in a method 500 of picking up a workpiece 300, and placing the workpiece 300 on a mating structure 410, using the pick-and-place system 100. As described above, the pick-and-place system 100 includes a strongback 120 supported by a robotic arm 114 of a robotic device 110. The pick-and-place system 100 additionally includes a plurality of actuator-clamp assemblies 130 mounted to the strongback 120. Each actuator clamp assembly 130 includes one or more jaw assemblies 170, and a multi-axis actuator 138 coupling the one or more jaw assemblies 170 to the strongback 120. As described above, each pair of jaw assemblies 170 is configured to clamp onto a localized segment 302 of the workpiece 300. As also mentioned above, the pick-and-place system 100 includes a controller 102 for controlling the robotic device 110 and the multi-axis actuators 138 and jaw assemblies 170 of each actuator-clamp assembly 130.

Referring to FIGS. 8-9, the method 500 includes tracking the spatial position and orientation of the actuator-clamp assemblies 130 using a tracking system 222. In the example described above, the tracking system 222 includes a tracking device 210 such as a laser tracker 212, and a plurality of tracking fixtures 214 respectively mounted to the plurality of actuator-clamp assemblies 130. Tracking fixtures 214 can also be mounted on workpiece pickup station 400 and a workpiece placement station 404. As mentioned above, the tracking fixture 214 includes tracking pins 218 and tracking reflectors 220. Interaction between the tracking device 210 and the tracking fixtures 214 provides measurements regarding the spatial position and orientation of the actuator-clamp assemblies 130 relative to each other and relative to the workpiece pickup station 400 and/or workpiece placement station 404.

The method 500 includes controlling, in real time using the controller 102, the robotic arm 114 and the multi-axis actuators 138 during the pick-up, orientation, and placement of the workpiece 300, based on inputs from the laser tracker 212 regarding the spatial position and orientation of the actuator-clamp assemblies 130. For example, the method 500 includes using the measurements from the tracking system 222 to position the strongback 120 at the workpiece pickup station 400 as shown in FIG. 8, in preparation for picking up the workpiece 300. In this regard, the method 500 includes using the tracking system measurements to command the robotic device 110 to move along the rails 116 until positioned at the workpiece pickup station 400. Once at the desired location at the workpiece pickup station 400, the method 500 includes using the tracking system measurements command the robotic arm 114 to position the strongback 120 at a distance above the workpiece 300 at which the workpiece orientation measuring devices 200 (e.g., laser profilometers 204) can provide measurements of the spatial position and orientation of the jaw assemblies 170 of each actuator-clamp assembly 130.

Referring to FIGS. 11-17, the method 500 further includes using at least one workpiece orientation measuring device 200 to measure the orientation and position of the actuator-clamp assemblies 130 relative to the workpiece 300 at the workpiece pickup station 400. In the example shown, the step of measuring the orientation and position of the workpiece 300 is performed using laser profilometers 204. As described above and illustrated in FIGS. 11-12, each laser profilometer 204 is configured to emit a laser beam 206, which results in a laser profile 208 (e.g., FIGS. 11, 12, and 22) on the surfaces of the workpiece 300 and on the workpiece pickup station 400 when the laser profilometers 204 are in close proximity to the workpiece pickup station 400.

Based on the laser profiles 208, the controller 102 generates measurements regarding the orientation and position of the actuator-clamp assemblies 130 relative to the workpiece 300. The method 500 includes operating the robotic arm 114 and/or the multi-axis actuators 138 based on measurements of the orientation and/or the position of the workpiece 300. More specifically, the method 500 includes aligning the jaw assemblies 170 of each actuator-clamp assembly 130 with the respective localized segments 302 of the workpiece 300 (e.g., the web 308 of the stringer 304) prior to clamping onto the workpiece 300. As described above, the process of aligning the jaw assemblies 170 with the localized segments 302 includes controlling the multi-axis actuators 138 in a manner to rotate the jaw assemblies 170 about their respective roll axes 144, pitch axes 146, and/or yaw axes 148 (FIG. 3) until the jaw assemblies 170 are oriented complementary to the workpiece 300. In the example of FIGS. 13-14, the process of aligning the jaw assemblies 170 with the workpiece 300 includes rotating each jaw assembly 170 about its respective pitch axis 146 until the jaw assemblies 170 are parallel to the web 308 of the stringer 304. As indicated above, each multi-axis actuators 138 can be provided as a 6-axis hexapod 140 having 6 linear actuators 142 operated in a coordinated manner.

Step 502 of the method 500 includes clamping onto the localized segments 302 of the workpiece 300, respectively using a plurality of the jaw assemblies 170 respectively of the plurality of actuator-clamp assemblies 130, as shown in FIG. 15. Step 502 of clamping onto the workpiece 300 comprises moving a movable jaw 174 of each jaw assembly 170 toward a fixed jaw 172 of the jaw assembly 170, until the workpiece 300 is clamped between the fixed jaw 172 and the movable jaw 174. In this regard, the method 500 includes using the controller 102 to command the jaw actuator 176 to move the movable jaw 174 of each jaw assembly 170 toward the fixed jaw 172.

In some examples, step 502 of clamping onto the workpiece 300 comprises clamping the workpiece 300 between a pair of one-way gripper pads 178 respectively mounted to the movable jaw 174 and the fixed jaw 172 of each jaw assembly 170. As described above and shown in FIGS. 6-7, each gripper pad 172 has a plurality of protrusions 180 oriented in manner such that the gripper pads 178 are configured to allow sliding movement of the workpiece 300 in a direction opposite the placement direction 182 as the workpiece 300 contacts the mating structure 410 as shown in FIGS. 23-24 described below. In addition, the gripper pads 178 are configured to resist sliding movement of the workpiece 300 between the gripper pads 178 in a placement direction 182 for placing the workpiece 300 onto the mating structure 410, such as when the workpiece 300 is lifted off the workpiece pickup station 400.

In still further examples, step 502 of clamping onto the workpiece 300 includes decelerating, using a shock absorber 184, the movable jaw 174 when approaching the fixed jaw 172, and prior to contacting the workpiece 300. As shown in FIGS. 6-7 and described above, each shock absorber 184 comprises a cylinder 186 and a piston 188 configured to reduce the closing rate of the movable jaw 174 as the movable jaw 174 moves toward the fixed jaw 172. Step 502 can include measuring, using feedback from the shock absorber 184, clamping pressure exerted on the workpiece 300 between the movable jaw 174 and the fixed jaw 172, as a means for maintaining the clamping pressure below a predetermined maximum. In this regard, the method 500 can include regulating, using the jaw actuator 176, the magnitude of the clamping pressure exerted by the movable jaw 174 on the workpiece 300, based on clamping pressure measurements generated by the shock absorber 184, to thereby prevent damage to the workpiece 300 from excessive clamping pressure.

Referring to FIGS. 18-20, step 504 of the method 500 includes picking up the workpiece 300 using the robotic arm 114. As mentioned above, the controller 102 uses measurements from the tracking system 222 to control the robotic arm 114 to lift the workpiece 300 off of the workpiece pickup station 400 as shown in FIG. 18. The method 500 further includes moving the robotic device 110 along the rails 116 to thereby transport the workpiece 300 from the workpiece pickup station 400 to the workpiece placement station 404 as shown in FIG. 19. The controller 102 uses the tracking system measurements to control the robotic arm 114 in a manner to locate the workpiece 300 over the mating structure 410, as shown in FIG. 20. In this regard, the method 500 includes lowering the workpiece 300 to a location above the mating structure 410 at which the above-described workpiece orientation measuring devices 200 (e.g., laser profilometers 204) can provide measurements of the spatial position and orientation of the workpiece 300 relative to the mating structure 410.

Figure 21:
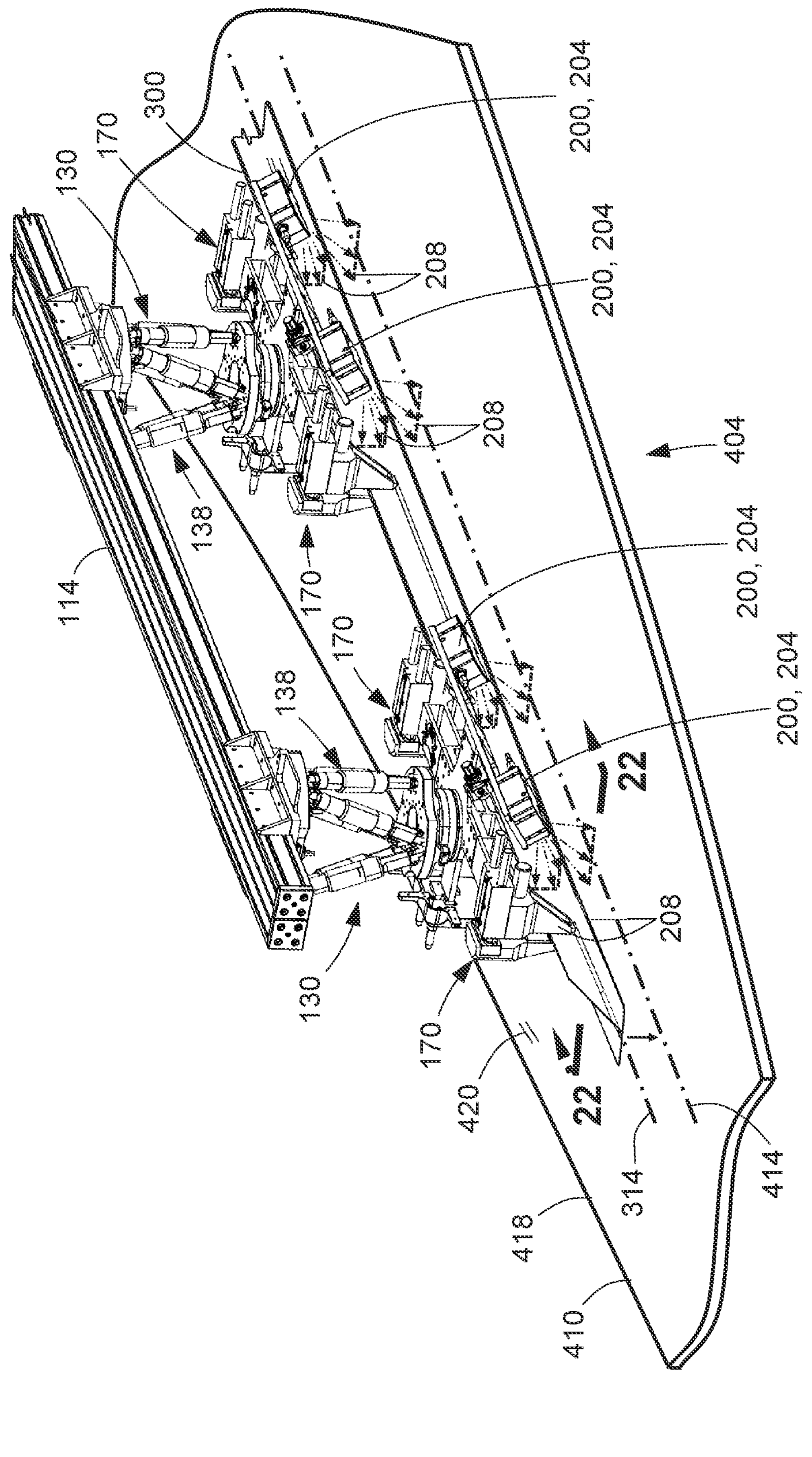
FIG. 21 shows a portion of the pick-and-place system lowering the stringer over a wing panel, illustrating the laser profilometers measuring the orientation and position of localized segments of the stringer relative to the wing panel.

Step 506 of the method 500 includes adjusting the orientation of the localized segments 302 when the workpiece 300 is supported in three-dimensional space by the strongback 120. Adjustment of the localized segments 302 is performed using a plurality of multi-axis actuators 138 (e.g., 6-axis hexapods 140) respectively coupling the plurality of jaw assemblies 170 to the strongback 120. The controller 102 uses measurements from the workpiece orientation measuring devices 200 (e.g., laser profilometers 204) to independently control the multi-axis actuators 138. As mentioned above, the laser profilometers 204 emit laser beams 206 that result in laser profiles 208 on the surfaces of the workpiece 300 and the mating structure 410, as shown in FIG. 21.

Step 506 of adjusting the orientation of the localized segments 302 can include using the laser profiles 208 to generate measurements regarding the spatial position and orientation of the workpiece 300 relative to the mating structure 410. Step 506 includes using such measurements to manipulate the localized segments 302 in a manner such that when the workpiece 300 is placed on the mating structure 410, the workpiece loft angle 316 of each localized segment 302 matches the local loft angle 416 of the mating structure 410, as shown in FIGS. 22-24.

During the process of manipulating the workpiece 300, the method 500 can include measuring torque on the plurality of localized segments 302 of the workpiece 300, respectively using a plurality of load cells 160 (e.g., FIGS. 3-4) respectively included with the plurality of actuator-clamp assemblies 130. During orientation of the localized segments 302 to their respective loft angles 316, the method 500 can additionally include operating the multi-axis actuators 138 based on the torque measurements from the load cell 160, in a manner to maintain the creep rate of the workpiece 300 material below a predetermined maximum. As mentioned above, maintaining the creep rate below a predetermined maximum can prevent ply wrinkling, ply buckling, or other anomalies that can otherwise occur during overly rapid twisting of a composite workpiece.

Step 506 additionally includes manipulating the localized segments 302 such that when the workpiece 300 is placed on the mating structure 410, the actual centerline 314 of each of the localized segments 302 will be aligned with the intended centerline 414 of the workpiece 300 on the mating structure 410. Advantageously, the multi-axis actuators 138 allow for manipulating the workpiece 300 with a degree of accuracy beyond that which is possible using the robotic arm 114 alone. In this regard, continuous measurements from the workpiece orientation measuring devices 200 (e.g., laser profilometers 204) allow for precise control of the multi-axis actuators 138 to provide precise manipulation and placement of the workpiece 300.

Step 508 of the method 500 includes placing the workpiece 300 in contact with the mating structure 410, by operating the robotic arm 114 in coordination with the multi-axis actuators 138. During the process of placing the workpiece 300 on the mating structure 410, the method 500 can include using the load cells 160 to continuously measure compaction pressure on the workpiece 300 at the location of each localized segment 302, to thereby maintain the compaction pressure below a predetermined maximum during placement on the mating structure 410. As mentioned above, force measurements (e.g., compaction pressure) from the load cells 160 can be continuously transmitted to the controller 102 for controlling the robotic arm 114 and/or the multi-axis actuators 138 in a manner to limit compaction pressure applied to the workpiece 300 against the mating structure 410. In this manner, damage to the workpiece 300 and/or mating structure 410 can be avoided.

Many modifications and other configurations of the disclosure will come to mind to one skilled in the art, to which this disclosure pertains, having the benefit of the teachings presented in the foregoing descriptions and the associated drawings. The configurations described herein are meant to be illustrative and are not intended to be limiting or exhaustive. Although specific terms are employed herein, they are used in a generic and descriptive sense only and not for purposes of limitation.

What is claimed is:

1. A pick-and-place system, comprising:

a rigid elongate strongback, configured to be supported by a robotic arm of a robotic device;

a plurality of actuator-clamp assemblies, mountable in spaced relation to each other on the strongback, and each actuator-clamp assembly comprises:

one or more jaw assemblies, each configured to clamp onto a localized segment of a workpiece;

a multi-axis actuator, configured to couple the one or more jaw assemblies to the strongback and adjust an orientation of the localized segment prior to placement of the workpiece onto a mating structure; and a controller configured to independently actuate the multi-axis actuators of the respective actuator-clamp assemblies to independently rotate corresponding localized segments of the workpiece to an orientation distinct from the orientation of an adjacent localized segment and thereby impart a twist to the workpiece along a lengthwise direction.

2. The pick-and-place system of claim 1, wherein:

each multi-axis actuator is a 6-axis hexapod having 6 actuators operable in a coordinated manner to adjust the orientation of the one or more jaw assemblies with 6 degrees of freedom.

3. The pick-and-place system of claim 1, wherein the jaw assembly of each actuator-clamp assembly includes:

a fixed jaw, a movable jaw, and a jaw actuator configured to move the movable jaw toward and away from the fixed jaw for clamping and unclamping the workpiece between the movable jaw and the fixed jaw.

4. The pick-and-place system of claim 3, wherein each jaw assembly comprises:

a pair of one-way gripper pads respectively mountable to the movable jaw and the fixed jaw, and configured to grip the workpiece while resisting sliding movement of the workpiece between the gripper pads in a placement direction toward the mating structure, and allowing sliding movement of the workpiece in a direction opposite the placement direction as the workpiece contacts the mating structure.

5. The pick-and-place system of claim 3, wherein each jaw assembly includes a shock absorber configured to:

decelerate the movable jaw when moving toward the fixed jaw and prior to contacting the workpiece; and measure a clamping pressure on the workpiece between the movable jaw and the fixed jaw, for feedback to the jaw actuator for maintaining the clamping pressure below a predetermined maximum.

6. The pick-and-place system of claim 1, wherein each actuator-clamp assembly includes:

a load cell interposed between the multi-axis actuator and the one or more jaw assemblies, and configured to measure torque and force on the localized segment of the workpiece;

wherein at least one of the robotic device and the multi-axis actuators are configured to perform at least one of the following in response to torque and force measurements from the load cell:

maintain a creep rate of a workpiece material below a predetermined maximum during orientation of the localized segment to a desired loft angle; and maintain a compaction pressure on the workpiece below a predetermined maximum during placement on the mating structure.

7. The pick-and-place system of claim 1, wherein each actuator-clamp assembly includes:

at least one workpiece orientation measuring device configured to measure the orientation and position of the workpiece;

wherein at least one of the robotic device and the multi-axis actuators are configured to perform at least one of the following in response to orientation and position measurements from the workpiece orientation measuring device:

align the one or more jaw assemblies of each actuator-clamp assembly with the respective localized segments prior to clamping onto the workpiece;

orient the localized segments such that when the workpiece is placed on the mating structure, a workpiece loft angle of each localized segment matches a mating structure loft angle of the mating structure; and position the localized segments on the mating structure such that an actual centerline of the localized segments is aligned with an intended centerline of the workpiece on the mating structure.

8. The pick-and-place system of claim 7, wherein the workpiece orientation measuring device comprises a laser profilometer.

9. The pick-and-place system of claim 1, where each actuator-clamp assembly includes:

a tracking fixture, mountable proximate the one or more jaw assemblies, and having tracking pins and reflectors for tracking, via a tracking device, a spatial position and orientation of the actuator-clamp assembly to facilitate real-time control of the robotic device and the multi-axis actuators during the pick-up, orientation, and placement of the workpiece.

10. A pick-and-place system, comprising:

a robotic device, having a robotic arm;

a rigid elongate strongback, supported by the robotic arm;

a plurality of actuator-clamp assemblies, mountable in spaced relation to each other on the strongback, and each actuator-clamp assembly comprises:

one or more jaw assemblies, each configured to clamp onto a localized segment of a workpiece;

a multi-axis actuator, configured to couple the one or more jaw assemblies to the strongback and adjust an orientation of the localized segment prior to placement of the workpiece onto a mating structure; and a controller, configured to;

independently actuate the multi-axis actuators of the actuator-clamp assemblies to independently rotate corresponding localized segments of the workpiece to an orientation distinct from the orientation of an adjacent localized segment and thereby impart a twist to the workpiece along a lengthwise direction; and control the robotic arm and the multi-axis actuator of each actuator-clamp assembly in a manner to position the workpiece on the mating structure such that an actual centerline of the localized segments of the workpiece is aligned with an intended centerline of the workpiece on the mating structure.

11. The pick-and-place system of claim 10, wherein:

the controller is further configured to control the multi-axis actuator of each actuator-clamp assembly in a manner to adjust the orientation of the localized segments such that when the workpiece is placed on the mating structure, a loft angle of each localized segment matches the loft angle of the mating structure.

12. A method of picking up a workpiece and placing on a mating structure, comprising:

clamping onto localized segments of a workpiece, respectively using a plurality of jaw assemblies respectively of a plurality of actuator-clamp assemblies mountable in spaced relation to each other on a rigid elongate strongback;

picking up the workpiece using a robotic arm coupled to the strongback;

adjusting an orientation of at least one of the localized segments when the workpiece is supported in three-dimensional space by the strongback, by independently actuating a multi-axis actuator of at least one of the actuator-clamp assemblies to independently rotate corresponding localized segments of the workpiece to an orientation distinct from the orientation of an adjacent localized segment and thereby impart a twist to the workpiece along a lengthwise direction; and placing the workpiece on a mating structure by operating the robotic arm in coordination with the multi-axis actuators.

13. The method of claim 12, wherein the step of adjusting the orientation of the localized segments using a plurality of multi-axis actuators comprises:

adjusting the orientation of the localized segments using a plurality of 6-axis hexapods, each having 6 actuators operating in a coordinated manner for movement with 6 degrees of freedom.

14. The method of claim 12, wherein the step of clamping onto the workpiece using the plurality of jaw assemblies comprises:

moving a movable jaw of each jaw assembly toward a fixed jaw of the jaw assembly.

15. The method of claim 14, wherein clamping onto the workpiece comprises:

clamping the workpiece between a pair of one-way gripper pads respectively mounted to the movable jaw and the fixed jaw of each jaw assembly;

wherein the gripper pads are configured to:

resist sliding movement of the workpiece between the gripper pads in a direction of placement of the workpiece onto the mating structure; and allow sliding movement of the workpiece in a direction opposite the placement direction as the workpiece contacts the mating structure.

16. The method of claim 14, wherein clamping onto the workpiece comprises:

decelerating, using a shock absorber, the movable jaw when approaching the fixed jaw and prior to contacting the workpiece; and measuring, using the shock absorber, a clamping pressure exerted on the workpiece between the movable jaw and the fixed jaw, for maintaining the clamping pressure below a predetermined maximum.

17. The method of claim 12, further comprising:

measuring torque and force on the localized segments of the workpiece, respectively using a plurality of load cells respectively included with the plurality of actuator-clamp assemblies; and operating at least one of the robotic arm and the multi-axis actuators based on measurements of at least one of torque and force from the load cell, to perform at least one of the following:

maintaining a creep rate of a workpiece material below a predetermined maximum during orientation of the localized segments to their respective desired loft angles; and maintaining a compaction pressure on the workpiece below a predetermined maximum during placement on the mating structure.

18. The method of claim 12, further comprising:

measuring the orientation and position of the workpiece relative to at least one of the actuator-clamp assembly and to the mating structure using at least one workpiece orientation measuring device;

operating at least one of the robotic arm and the multi-axis actuators based on measurements of at least one of orientation and position of the workpiece from the workpiece orientation measuring device, to perform at least one of the following:

aligning the one or more jaw assemblies of each actuator-clamp assembly with the respective localized segments of the workpiece prior to clamping onto the workpiece;

orienting the localized segments such that when the workpiece is placed on the mating structure, a loft angle of each localized segment matches the loft angle of the mating structure; and positioning the localized segments on the mating structure such that an actual centerline of each of the localized segments is aligned with an intended centerline of the workpiece on the mating structure.

19. The method of claim 18, wherein measuring the orientation and position of the workpiece comprises:

measuring the orientation and position of the workpiece using a laser profilometer.

20. The method of claim 12, further comprising:

tracking, using a laser tracker and a plurality of tracking fixtures respectively coupled to the plurality of actuator-clamp assemblies, a spatial position and orientation respectively of the actuator-clamp assemblies; and controlling, in real time using a controller, the robotic arm and the multi-axis actuators during the pick-up, orientation, and placement of the workpiece, based on inputs from the laser tracker regarding the spatial position and orientation of the actuator-clamp assemblies.

* * * * *